(12) United States Patent
Aruga et al.

(10) Patent No.: US 8,815,140 B2
(45) Date of Patent: Aug. 26, 2014

(54) METHOD OF PRODUCING FILM BY INKJET PROCESS, AND FILM

(75) Inventors: Tamotsu Aruga, Kanagawa (JP); Shinya Seno, Kanagawa (JP); Masayuki Koyano, Kanagawa (JP); Eiji Noda, Kanagawa (JP); Noriyasu Takeuchi, Kanagawa (JP); Tsutomu Maekawa, Kanagawa (JP); Takao Hiraoka, Kanagawa (JP); Tomoko Hasegawa, Ibaraki (JP); Okitoshi Kimura, Kanagawa (JP); Soh Noguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 53 days.

(21) Appl. No.: 13/640,198

(22) PCT Filed: Apr. 8, 2011

(86) PCT No.: PCT/JP2011/059330
§ 371 (c)(1), (2), (4) Date: Oct. 9, 2012

(87) PCT Pub. No.: WO2011/126148
PCT Pub. Date: Oct. 13, 2011

(65) Prior Publication Data
US 2013/0065024 A1 Mar. 14, 2013

(30) Foreign Application Priority Data
Apr. 9, 2010 (JP) .................................. 2010-090842

(51) Int. Cl.
*B41J 2/21* (2006.01)

(52) U.S. Cl.
USPC .......................................... 264/298; 347/105

(58) Field of Classification Search
USPC .......................................... 264/298; 347/105
See application file for complete search history.

(56) References Cited

U.S. PATENT DOCUMENTS

| 4,554,555 A | 11/1985 | Aruga et al. |
| 4,581,071 A | 4/1986 | Akutsu et al. |
| 4,620,876 A | 11/1986 | Fujii et al. |

(Continued)

FOREIGN PATENT DOCUMENTS

| JP | 2003-191594 | 7/2003 |
| JP | 2003-311196 | 11/2003 |

(Continued)

OTHER PUBLICATIONS

International Search Report Issued Aug. 2, 2011 in International Patent Application No. PCT/JP2011/059330 Filed Apr. 8, 2011.

*Primary Examiner* — Galen Hauth
(74) *Attorney, Agent, or Firm* — Oblon, Spivak, McClelland, Maier & Neustadt, L.L.P.

(57) ABSTRACT

To provide a method of producing a film, comprising: ejecting a liquid B over a liquid surface of an active energy ray-curable liquid as a liquid A by an inkjet process, according to a predetermined periodic signal; and subsequently applying an active energy ray to the liquid A and the liquid B so as to perform curing and obtain a film which comprises a pattern according to any one of (1) to (4) below, (1) a smooth pattern having a periodic amplitude based upon a trigonometric function, (2) a pattern having a periodic depression, (3) a pattern in the form of a periodic flat surface, and (4) a pattern having a periodic semicylindrical shape.

17 Claims, 19 Drawing Sheets

(56) References Cited

U.S. PATENT DOCUMENTS

| | | | |
|---|---|---|---|
| 4,631,085 | A | 12/1986 | Kawanishi et al. |
| 4,647,310 | A | 3/1987 | Shimada et al. |
| 4,711,668 | A | 12/1987 | Shimada et al. |
| 4,713,113 | A | 12/1987 | Shimada et al. |
| 4,737,190 | A | 4/1988 | Shimada et al. |
| 4,793,860 | A | 12/1988 | Murakami et al. |
| 5,622,550 | A | 4/1997 | Konishi et al. |
| 5,810,915 | A | 9/1998 | Nagai et al. |
| 5,879,439 | A | 3/1999 | Nagai et al. |
| 5,882,390 | A | 3/1999 | Nagai et al. |
| 5,972,082 | A | 10/1999 | Koyano et al. |
| 5,993,524 | A | 11/1999 | Nagai et al. |
| 6,120,589 | A | 9/2000 | Bannai et al. |
| 6,231,652 | B1 | 5/2001 | Koyano et al. |
| 6,261,349 | B1 | 7/2001 | Nagai et al. |
| 6,613,136 | B1 | 9/2003 | Arita et al. |
| 6,688,737 | B2 | 2/2004 | Nagai et al. |
| 2002/0096085 | A1 | 7/2002 | Gotoh et al. |
| 2003/0064206 | A1 | 4/2003 | Koyano et al. |
| 2003/0079647 | A1 | 5/2003 | Kaneko et al. |
| 2003/0107632 | A1 | 6/2003 | Arita et al. |
| 2005/0007431 | A1 | 1/2005 | Koyano et al. |
| 2006/0092254 | A1 | 5/2006 | Claes et al. |
| 2006/0262410 | A1 | 11/2006 | Toyoda |
| 2007/0197685 | A1 | 8/2007 | Aruga et al. |
| 2007/0206045 | A1 | 9/2007 | Umebayashi et al. |
| 2007/0221079 | A1 | 9/2007 | Aruga et al. |
| 2007/0296790 | A1 | 12/2007 | Nakazawa et al. |
| 2008/0012887 | A1 | 1/2008 | Maeno et al. |
| 2008/0273045 | A1 | 11/2008 | Morohoshi et al. |
| 2008/0311299 | A1 | 12/2008 | Furukawa |
| 2009/0043028 | A1 | 2/2009 | Matsuyama et al. |
| 2009/0085996 | A1* | 4/2009 | Kasai ........................... 347/100 |
| 2009/0162569 | A1 | 6/2009 | Morohoshi et al. |
| 2009/0186162 | A1 | 7/2009 | Namba et al. |
| 2009/0239044 | A1 | 9/2009 | Habashi et al. |
| 2010/0196601 | A1 | 8/2010 | Goto et al. |
| 2010/0196602 | A1 | 8/2010 | Koyano et al. |
| 2011/0060100 | A1 | 3/2011 | Kimura et al. |

FOREIGN PATENT DOCUMENTS

| | | |
|---|---|---|
| JP | 2004-104104 | 4/2004 |
| JP | 2005-066530 | 3/2005 |
| JP | 2005-326662 | 11/2005 |
| JP | 2006-137185 | 6/2006 |
| JP | 2006-323147 | 11/2006 |
| JP | 2007-231206 | 9/2007 |
| JP | 2007-261203 | 10/2007 |
| JP | 2008-020559 | 1/2008 |
| JP | 2008-023980 | 2/2008 |
| JP | 2008-062372 | 3/2008 |
| JP | 2008-105375 | 5/2008 |
| JP | 2008-105382 | 5/2008 |
| JP | 2008-105387 | 5/2008 |
| JP | 2008-137156 | 6/2008 |
| JP | 2008-183486 | 8/2008 |

* cited by examiner 28 msec 36 msec 63 msec 500 msec 40,000 msec

The greater the layer thickness of the liquid A is and the lower the viscosity of the liquid A is, the more quickly the amplitude attenuates.

Repellency occurs as the distance between dots increases and the layer thickness of the liquid A decreases.

c

METHOD OF PRODUCING FILM BY INKJET PROCESS, AND FILM

TECHNICAL FIELD

The present invention relates to a method of producing a film by an inkjet process, which makes it possible to form a periodic pattern with a specific feature, and a film produced by the method.

BACKGROUND ART

In the past, numerous image forming methods which involve ejecting an ultraviolet-curable material over the liquid surface of an ultraviolet-curable resin liquid by an inkjet process have been proposed (refer to PTLs 1 to 6).

PTL 1 proposes an invention in which colored droplets are applied onto a radiation-curable liquid layer and then curing is carried out so as to obtain a fixed dotted shape with uniform glossiness and without bleeding.

However, this proposal is not for forming a characteristic (cell) pattern that spreads over an entire liquid surface as in the present invention. Also, this proposal greatly differs from the present invention in that a colorant as a second ejection liquid does not spread over the liquid surface of the liquid layer but enters the liquid layer, as seen in FIGS. 1b and 1c used for the proposal.

The invention of PTL 2 is intended to avoid attachment-related interference and is not for forming a (cell) pattern that spreads over an entire liquid surface as in the present invention.

The invention of PTL 3 is intended to prevent bleeding and includes a semi-curing step.

The invention of PTL 4 includes improving air sending and is not for forming a (cell) pattern as in the present invention.

The invention of PTL 5 uses a primer containing a high-boiling-point organic solvent and is not for forming a characteristic (cell) pattern as in the present invention.

As just described, the above prior-art documents are similar to the present invention in that an ultraviolet-curable liquid is ejected over the liquid surface of an ultraviolet-curable material liquid; however, all the above prior-art documents are intended to prevent bleeding and improve glossiness and are not for forming a characteristic (cell) pattern as in the present invention.

PTL 6 gives a Comparative Example in which a liquid A has a higher surface tension than a liquid B; however, the surface tension of the liquid A is relatively small and does not suffice to form favorable patterns. Moreover, although there is an expression of "spreading of dots", there is neither a mention nor a suggestion of formation of a (cell) pattern where a colorant spreads over an entire surface including parts between adjacent dots, as the colorant is centered at portions to which droplets of the colorant have been ejected.

PTL 7 discloses application of a pattern, formed by ejecting a liquid B over a liquid A, to production of a device; however, the liquid A has a lower surface tension than the liquid B, and it is not that the liquid B uniformly spreads over the liquid surface of the liquid A.

CITATION LIST

Patent Literature

PTL 1 Japanese Patent Application Laid-Open (JP-A) No. 2006-137185
PTL 2 JP-A No. 2007-261203
PTL 3 JP-A No. 2008-105387
PTL 4 JP-A No. 2008-105382
PTL 5 JP-A No. 2008-137156
PTL 6 JP-A No. 2007-231206
PTL 7 JP-A No. 2008-62372

SUMMARY OF INVENTION

Technical Problem

Nowadays, attempts to produce a variety of functional devices (e.g., organic liquid-crystal color filters, organic transistors, organic solar batteries, organic electroluminescence elements and piezoelectric heads) by inkjet processes are being actively made. One common problem with these attempts is difficulty in obtaining an intended shape in an intended position owing to the occurrence of bleeding, fusion, etc. of dots caused by variation in accuracy in terms of positions where the dots are jetted or variation in the wettability of a substrate surface. To solve this problem, in general, a hydrophilic or hydrophobic pattern is formed over a substrate beforehand. However, this requires a special process such as photolithography, and thus it is still difficult to eject a material surely to intended positions.

As described above, there has been no known simple pattern-forming method suitable for thinly and uniformly spreading a functional material such as a colorant by an inkjet process.

Also, none of the following methods are known: a method wherein a pattern, having a concavo-convex portion based upon a periodic, exquisite approximate sine curve, for decoration on a wall, etc. is produced easily and at high speed by an inkjet process; a method of accurately forming a pattern, which has a periodic depression of the order of a micrometer, over a flat member; a method of obtaining ideal pixels which have a pattern in the form of a periodic flat surface where a colorant uniformly spreads without bleeding; and a method wherein a shape having a periodic semicylindrical shape is obtained with ease only by ejection of ink droplets.

Hence, inkjet processes which make it possible to solve the problems and can be applied to a variety of purposes as mentioned above are demanded. Specifically, the following are demanded: a process wherein a functional material can be accurately placed in intended positions, and a smooth, periodic concavo-convex pattern can be formed; a process of uniformly applying a functional material such as a coloring pigment or a charge-generating agent over an entire surface; a process of accurately forming a periodic depression of the order of a micrometer in a flat surface; a method of obtaining ideal pixels having a pattern in the form of a periodic flat surface where a colorant uniformly spreads without bleeding; and a method wherein a shape having a periodic semicylindrical shape is obtained with ease only by ejection of ink droplets.

The present invention is designed to solve the problems in related art and aimed at providing a method of accurately and easily producing a film having a periodic pattern, and a film produced by this method.

Further, the present invention is also aimed at providing a method for preventing, for example, a colorant-containing ink from bleeding and spreading to surroundings of a solid image formed of the ink, by using the above-mentioned method.

Solution to Problem

The foregoing aims are achievable by using an inkjet process wherein, over the surface of a layer of an active energy ray-curable liquid (liquid A), another liquid (liquid B) is ejected, and by adjusting physical properties of each liquid. Here, the liquid B ejected is not necessarily a photocurable material, and the liquid B can be used for the purpose of spreading a functional material contained in the liquid B, provided that the liquid B satisfies conditions of surface tension.

Specifically, the problems can be solved by <1> to <19> below.

<1> A method of producing a film, including: ejecting a liquid B over a liquid surface of an active energy ray-curable liquid as a liquid A by an inkjet process, according to a predetermined periodic signal; and subsequently applying an active energy ray to the liquid A and the liquid B so as to perform curing and obtain a film which includes a pattern according to any one of (1) to (4) below, (1) a smooth pattern having a periodic amplitude based upon a trigonometric function, (2) a pattern having a periodic depression, (3) a pattern in the form of a periodic flat surface, and (4) a pattern having a periodic semicylindrical shape.

<2> The method according to <1>, wherein the liquid B contains a functional material.

<3> The method according to <1> or <2>, wherein the liquid B is an active energy ray-curable liquid, the liquid A is greater than the liquid B in static surface tension at 25° C., and the liquid A has a static surface tension of 35 mN/m or greater at 25° C.

<4> The method according to any one of >1> to <3>, wherein the diameter of an ejected droplet formed as the liquid B is ejected is 0.4 or less times the distance between ejected dots formed of the ejected liquid B.

<5> The method according to any one of <1> to <4>, wherein the pattern is a pattern in the form of cells, where the liquid B is centered at a central portion of a liquid B-ejected portion and uniformly spreads as far as a point close to a midpoint between the central portion and a central portion of an adjacent liquid B-ejected portion, thereby spreading over the entire liquid surface of the liquid A except for the midpoint and a peripheral portion where the liquid B is not ejected.

<6> The method according to any one of <1> to <5>, wherein the pattern is the smooth pattern according to (1), having a periodic amplitude of 1 μm or greater based upon a trigonometric function, where the liquid B spreads over the liquid surface of the liquid A, the liquid B-ejected portion serves as a concave portion, and there is a convex portion in the vicinity of a midpoint between adjacent concave portions; and wherein the liquid A has a viscosity of 50 mPas or greater at 25° C., and the length of time between the ejection of the liquid B and the curing is within 300 milliseconds.

<7> The method according to any one of <1> to <5>, wherein the pattern is the pattern according to (2), where the depression is periodically formed at a midpoint between adjacent liquid B-ejected portions; and wherein the liquid A has a viscosity of 1,000 mPas or greater at 25° C., and the active energy ray is applied to perform the curing, when 300 milliseconds or more have passed after the ejection of the liquid B.

<8> The method according to any one of <1> to <5>, wherein the pattern is the pattern according to (3); and wherein the liquid A has a viscosity of 50 mPas or greater at 25° C., and the active energy ray is applied to perform the curing, when 300 milliseconds or more have passed after the ejection of the liquid B.

<9> The method according to any one of <1> to <5>, wherein the pattern is the pattern according to (3); and wherein the liquid A has a viscosity of 50 mPas or less at 25° C., and the active energy ray is applied to perform the curing, within 300 milliseconds after the ejection of the liquid B.

<10> The method according to any one of <1> to <5>, wherein the pattern is the pattern according to (4); and wherein the liquid A has a viscosity of 50 mPas or less at 25° C. and a static surface tension of 40 mN/m or greater at 25° C., the liquid A has a layer thickness of 10 μm or less, and the active energy ray is applied to perform the curing, when 300 milliseconds or more have passed after the ejection of the liquid B.

<11> The method according to <1>, wherein the film has the pattern according to (4), where distances between dots formed of the liquid B with respect to an X-axis direction and a Y-axis direction at the time when the liquid B is ejected are adjusted such that the shorter distance between the dots corresponds to a major axis direction of the semicylindrical shape.

<12> The method according to any one of <1> to <5>, wherein the pattern is the pattern according to any one of (1) to (3); and wherein the static surface tension of the liquid A at 25° C. is adjusted to 35 mN/m to 40 mN/m and the layer thickness of the liquid A is adjusted to 10 μm or less so as to form a thin-film pattern without a semicylindrical shape.

<13> The method according to any one of <1> to <12>, further including applying the liquid A over a substrate prior to the ejection of the liquid B, wherein the substrate has an arithmetic mean roughness (Ra) of 1 μm or less.

<14> The method according to <1>, wherein the liquid B is prepared using an ink which contains a functional material and a clear ink which does not contain a functional material; and wherein the clear ink is ejected around a portion to which the ink which contains the functional material is ejected, so as to prevent the functional material from excessively spreading.

<15> The method according to <2>, wherein the speed at which the liquid B spreads in a circle over the liquid A upon ejection of the liquid B is examined beforehand; and wherein the functional material is prevented from excessively spreading by determining the length of time between the ejection of the liquid B and the curing such that the active energy ray is applied at a timing when the diameter of the circle is equivalent to $\sqrt{2} \pm 50\%$ of the length of one side of a pixel.

<16> The method according to <2>, wherein the speed at which the liquid B spreads in a circle over the liquid A upon ejection of the liquid B is examined beforehand; and wherein a smooth film having the pattern in the form of the periodic flat surface according to (3), where the functional material uniformly spreads, is formed by determining the length of time between the ejection of the liquid B and the curing such that the active energy ray is applied at a timing when the diameter of the circle is 1.5 or more times the length of one side of a pixel.

<17> The method according to <1>, wherein two or more liquids B which contain different functional materials are used, and the difference in dot spreading speed between the liquids B is within ±50%.

<18> A film obtained by the method according to any one of <1> to <17>, including: a pattern according to any one of (1) to (4) below, (1) a smooth pattern having a periodic amplitude based upon a trigonometric function, (2) a pattern having a periodic depression, (3) a pattern in the form of a periodic flat surface, and (4) a pattern having a periodic semicylindrical shape.

<19> A film used for any one of an inkjet image, a liquid-crystal color filter, a photoelectric conversion element, a solar battery, an organic electroluminescence element, an electrode, an organic transistor, an antireflection film, a lenticular lens, a biochip and an allergy-testing chip, the film including:

the film according to <18> at least partially, wherein the liquid B contains at least one selected from the group consisting of a colorant, a photoelectric conversion material, a light-emitting material, a conductive material, a particle with a light scattering function, a transparent emulsion resin particle and a biofunctional material.

Advantageous Effects of Invention

According to the present invention, it is possible to provide a method of accurately and easily producing a film having a periodic pattern, and a film produced by this method.

Also, in the case when an inkjet image is to be obtained using an ultraviolet-curable ink, it is possible to obtain an image having less variation in colorant concentration.

Also, by using the foregoing method, it is possible to provide a method for preventing, for example, a colorant-containing ink from bleeding and spreading to surroundings of a solid image formed of the ink.

Also, by using the foregoing method, it is possible to thinly and uniformly apply a functional material for use in a functional material-containing layer (e.g., a charge-generating layer of a photoelectric conversion element, a pigment colored layer of a color filter, a light-emitting layer and a charge-transporting layer of an organic light-emitting element, or a charge transfer layer and an electrode layer of an organic transistor) by means of an operation of simply ejecting inkjet droplets.

Also, by using the foregoing method, the distance between places where a functional material is present can be shortened; in the case where the functional material is a conductive material, presumably it is theoretically possible to produce an organic transistor with the distance between a source electrode and a drain electrode being short.

BRIEF DESCRIPTION OF DRAWINGS

FIG. 2A shows a result of measurement of an amplitude of the film.

FIGS. 8-1 to 8-8 show three-dimensional images of photographs (taken with a laser microscope) of films of Example 7.

DESCRIPTION OF EMBODIMENTS

Figure 1A:
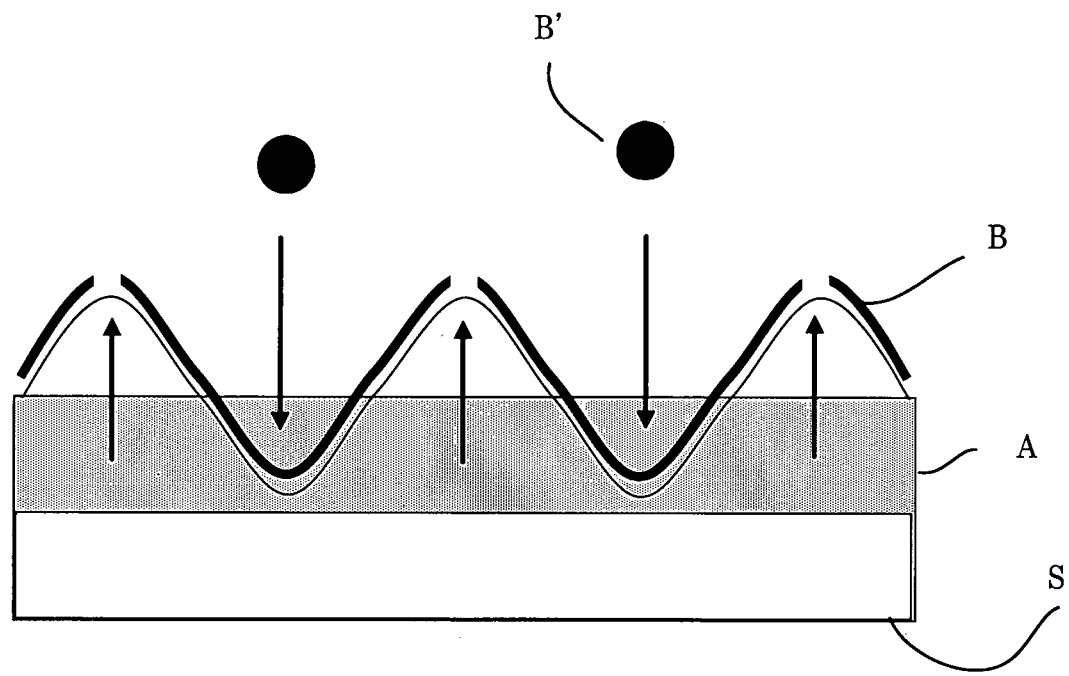
FIG. 1A is a schematic drawing showing a state where a pattern according to (1) is formed when a liquid B has been ejected over the liquid surface of a liquid A.

The following specifically explains embodiments of the present invention.

In the present invention, over a liquid surface of an active energy ray-curable liquid (i.e., a liquid which is curable by an active energy ray) as a liquid A, a liquid B which is preferably an active energy ray-curable liquid is ejected by an inkjet process according to a predetermined periodic signal, and subsequently an active energy ray is applied to the liquid A and the liquid B so as to perform curing and obtain a film which has a pattern according to any one of (1) to (4) below:

(1) a smooth pattern having a periodic amplitude based upon a trigonometric function, (2) a pattern having a periodic depression, (3) a pattern in the form of a periodic flat surface, and (4) a pattern having a periodic semicylindrical shape.

Regarding the pattern according to (1) above, a liquid B-ejected portion (i.e., a portion to which the liquid B has been ejected) serves as a concave portion, and there is a convex portion in the vicinity of a midpoint between adjacent concave portions. In other words, the cured film has, as its surface shape, a smooth pattern having a periodic amplitude based upon a trigonometric function, with respect to a direction perpendicular to the liquid surface of the liquid A prior to the ejection of the liquid B. The pattern according to (2) above has a periodic depression. The pattern according to (3) above is in the form of a periodic flat surface. Regarding all these patterns, the liquid B spreads over the liquid surface of the liquid A. The pattern formation is thought to be due to the fact that cells of a layer of the liquid B are not completely joined together and a very narrow layer of the liquid A is present between the cells. The capability of forming a very narrow boundary between a cell of the liquid B (which may contain a functional material) and an adjacent cell of the liquid B as described above offers potential for utilization. For example, the present invention can be applied to an electronic component which requires the distance between electrodes to be small.

Here, the term "smooth" in relation to the pattern according to (1) means smooth as a mathematical term, or more specifically, continuous including a differential coefficient. The term "trigonometric function" will be explained later.

Note that the pattern according to any one of (1) to (3) has the liquid B regularly spreading in the form of cells when seen from above as shown in drawings later explained, and so will be hereinafter referred to also as "cell pattern"; meanwhile, any pattern wherein the liquid A has a low static surface tension and the liquid B does not sufficiently spread but is in the form of dots will be hereinafter referred to also as "dot pattern". In the present specification, the term "dot pattern" means a pattern where ejected droplets of the liquid B do not spread over the liquid A (unlike in the case of the cell pattern) but remain in the form of dots (points) after the droplets of the liquid B have reached the liquid A.

A feature of the present invention is that, by simply ejecting droplets, which contain a functional material, one by one, it is possible to spread the functional material thinly and uniformly over a substrate. And use of a colorant (such as a pigment or dye) as the functional material makes it possible to form an ideal dotted shape for an inkjet image. More specifically, a uniform image without variation in colorant concentration on a two-dimensional surface can be formed. The present invention can be applied to a liquid-crystal color filter, for example.

Also, in the case where the functional material is a pigment with a photocharge-generating function (e.g., phthalocyanine, titanium oxide, zinc oxide or amorphous silicon), presumably it is possible to produce a photoelectric conversion element, a photoconductor, a solar battery, etc. with less variation in light absorption on a two-dimensional surface by simply performing inkjet ejection.

In the case where the present invention is applied to a light-emitting material of an organic electroluminescence element, presumably it is possible to reduce variation in light emission. Also, presumably the present invention can be applied to a simple process of producing a charge-transporting layer.

Also, in the case where a liquid containing a conductive material is ejected in accordance with the present invention, a simple electrode-producing method will be yielded, and presumably it is theoretically possible to utilize the narrow space between cells for the part between a source electrode and a drain electrode and thus produce a high-speed organic transistor.

Also, in the case where fine particles capable of light scattering and larger than those of submicron order are used as the functional material, it is possible to form, for example, a uniform antireflection film with ease.

The above-mentioned purposes will be particularly effectively satisfied by the pattern according to (3) among the patterns according to (1) to (4).

As for the pattern according to (4), presumably it can be used, for example, in production of a lenticular lens, taking advantage of its shape. In that case, the liquid A and the liquid B need to become transparent films after cured.

Also, in the case where the functional material is DNA, an antibody or the like, presumably it is possible to apply the present invention to simple production of a biochip, an allergy-testing chip, etc.

Regarding the film having the pattern according to any one of (1) to (4), the liquid B spreads relatively uniformly over the liquid surface of the liquid A. It has been confirmed that, especially in the case where the liquid B contains a pigment, etc. as a functional material, the functional material spreads over the entire liquid surface of the liquid A (although spreading of single dots is limited, it can be confirmed that they can sufficiently spread if they are ejected at a resolution of 150 dpi and an adequate amount of time is spent between their ejection and curing). In the case where the amount of time spent until the curing is not adequate and satisfactory flat surfaces cannot be formed, the spreading of the functional material is not completely uniform; especially in the case where the longitudinal amplitude of the pattern according to (1) is great, the functional material is present in larger amounts at the centers of concave portions. Meanwhile, regarding the patterns according to (2) and (3), the functional material (such as a pigment) contained in the liquid B spreads fairly uniformly.

Which of the patterns according to (1) to (4) and the dot patterns in Comparative Examples is given to an obtained film is determined by the physical properties of the liquids A and B, and the length of time spent after the ejection of the liquid B and until the active energy ray is applied so as to perform curing.

To obtain a film having the pattern according to any one of (1) to (4), the physical properties of the liquids A and B matter. Unless the static surface tension of the liquid A is high to some extent (35 mN/m or greater, preferably 37 mN/m or greater, at 25° C.), it is impossible to obtain a film having a perfect cell pattern. Parenthetically, the static surface tension can be measured at 25° C. using a static surface tension measuring apparatus (Model CBVP-Z, manufactured by Kyowa Interface Science Co., Ltd.).

Especially when there is a surfactant present in the liquid A, a film having the pattern according to any one of (1) to (4) is hard to obtain, with the liquid B entering part of the liquid A and remaining instead of spreading (a dot pattern is formed).

When the static surface tension of the liquid A is 30 mN/m or greater, but less than 35 mN/m, a pattern which is somewhere between a cell pattern and a dot pattern is obtained. Although this pattern is imperfect as a cell pattern, its use will be possible depending upon the case.

The case where the static surface tension of the liquid B is in the range of 20 mN/m to 25 mN/m is stated above; when the static surface tension of the liquid B is beyond 30 mN/m, the extent to which the liquid A spreads is small.

Even when the static surface tension of the liquid A is high and conditions for obtaining a film having the pattern according to any one of (1) to (4) are satisfied, it is not necessarily true that a film having the pattern according to any one of (1) to (4) can be surely obtained using whatever liquids. It should be particularly noted that a film which has the pattern having a periodic depression according to (2) cannot be obtained unless required conditions are suitably met.

The shorter the length of time spent after the ejection of the liquid B and until the application of the active energy ray is, the more easily a film having the pattern according to (1) can be obtained.

The greater the length of time spent after the ejection of the liquid B and until the application of the active energy ray is, the more easily a film having the pattern according to (3) can be obtained.

Note that when the liquid A has a low viscosity and a high static surface tension, the pattern in the form of a periodic flat surface is observed immediately (several tens of milliseconds) after the application of the active energy ray, presumably because the pattern according to (1) quickly changes to the pattern according to (3).

It has been confirmed that a film having the pattern according to (2) can be obtained when the liquid A has a high viscosity (1,000 mPas or greater). Also, it is difficult to obtain a film which has the pattern having a periodic depression, unless the substrate has high smoothness and high positional accuracy is secured in relation to portions to which droplets are ejected.

It has been found that a film having the pattern according to (4) is formed as a phenomenon of repellency proceeds, in the case where the liquid A has a low viscosity and a high static surface tension, the liquid A has a small layer thickness of 10 μm or less and there is a difference between vertical resolution and horizontal resolution.

Also, when the liquid A has a layer thickness of less than several micrometers, it is difficult to obtain a pattern perfectly based upon a trigonometric function regarding the pattern according to (1), and an irregular pattern, with a bottom surface being partially exposed, may be obtained instead.

Also, when the liquid A has a layer thickness of several micrometers or greater, it is possible to obtain a film which has a pattern having a periodic amplitude approximately based upon a trigonometric function. However, when the liquid A has an even greater layer thickness, the amplitude attenuates more quickly; in the case where the length of time spent after the ejection of the liquid B and until the application of the active energy ray is constant, the greater the layer thickness of the liquid A is, the smaller the amplitude is. It means that, to obtain a film having the pattern according to (1), it is necessary to shorten the length of time between the ejection of the liquid B and the application of the active energy ray in inverse proportion to the layer thickness of the liquid A.

In the case where the liquid A has a great layer thickness, a film having the pattern in the form of a periodic flat surface according to (3) is easily obtained when the length of time between the ejection of the liquid B and the application of the active energy ray is relatively short. It should, however, be noted that, as stated above, when the liquid A has a low viscosity and a high static surface tension, a pattern in the form of a periodic flat surface is quickly formed even if the layer thickness of the liquid A is not much great.

Although being of micro size, the foregoing patterns have exquisite shapes and can be used for decoration-related purposes, for example. Also, although liquid ejection generally takes place symmetrically in vertical and horizontal terms with resolutions of 150 dpi×150 dpi, it is possible to vary the resolutions periodically and thus to improve a decorative effect. Also, the patterns according to (1) to (4) differ from one another in frictionality, and so the shape may be selected according to the intended purpose.

In the case where a pigment as the functional material is contained in the liquid B, the pigment spreads relatively uniformly and a relatively uniform layer thereof is formed over the liquid surface of the liquid A, so that the present invention has a variety of applications.

For instance, when the pigment-containing liquid B is used for an image, the pigment is not inefficiently segregated to parts, and the image density dramatically improves even with an equal pigment concentration per unit area. In other words, ideal pixels can be produced. Also, since cells are independent of one another, so-called bleeding does not arise beyond each cell, and ideal pixels can be obtained. In the case where there are no dots alongside existing dots, for example on the periphery of a solid image, the pigment may spread too much; there is, however, no problem if a clear ink (not colored) is used for dots on the periphery. In that case, it is preferred that the clear ink and the colored ink be ejected approximately at the same time. To make that possible, it is sometimes necessary to regulate the ejection direction of a head such that the clear ink and the colored ink can be ejected over approximately the same places approximately at the same time. This regulation is enabled by slightly changing the direction of the head or changing the shape of nozzles. There is, of course, no problem in the case of high-speed ink application. In reality, when the difference in time between the ejection of the clear ink and the ejection of the colored ink is within 1 second, there is not a serious problem. Also, if the speed at which the pigment spreads is examined beforehand and adjustment of timing is performed such that curing with the active energy ray takes place when the pigment spreads to the size of each pixel, the pigment can be prevented from excessively spreading.

In the case of the pattern having a periodic depression according to (2), it is preferred that the difference between the time of liquid ejection for a dot and the time of liquid ejection for an adjacent dot be small. Also, to obtain this pattern, positional control of dots has to be accurate and the substrate needs to have smoothness. This pattern according to (2) is, in some cases, a pattern of depressions or, in other cases, a pattern of depressions with protrusions seen in the depressions. Although the mechanism for the formation of the pattern is not very clear, it has been found that each depression or each depression with a protrusion appears like a singular point at the center of four dots. Presumably this pattern changes to a pattern of flat surfaces as time passes, and presumably the state of the pattern in the transition is fixed by the utilization of the active energy ray.

The above-mentioned patterns are effective not only in producing images but also in producing devices by inkjet. In the case of the pattern according to (1), for example, it is possible to form concave portions which are several micrometers or greater in depth, so that the pattern can be used for a base material in which to store a functional material at intended positions. Also, in the case where this pattern is used for a charge-generating layer of a photoconductor or of an organic solar battery, the charge-generating layer can be uniformly applied, and thus charge can be efficiently generated. Further, since cells are divided by narrow boundaries, so that when this pattern is used for a photosensitive layer of a photoconductor or of a photoelectric conversion element, bleeding of an electrophotographic image, caused by decrease in resistance with respect to a lateral direction, can be prevented. It goes without saying that this pattern can be used for a liquid-crystal color filter with ease.

Also, if a liquid containing a functional material is further ejected over the film of the present invention, the functional material can be surely stored.

Also regarding the pattern according to (1), a base material having a cell structure with this pattern can be utilized as a reaction field of a minute area in combinatorial chemistry, for example. This pattern can also be utilized for a reaction field for a biomaterial (e.g., antigen-antibody reaction) in relation to a biochip. As just described, this pattern can be utilized for a variety of base materials of devices based upon inkjet processes.

Meanwhile, a method which involves forming the pattern in the form of a periodic flat surface according to (3) is presumably most suitable as a method capable of smoothly and uniformly applying a functional material by inkjet and is a very useful method which can replace conventional complicated methods such as spin coating and photoresist technology.

Regarding the pattern according to (4), when the distance between dots with respect to a vertical direction and the distance between dots with respect to a horizontal direction differ, the liquid A shifts toward places where the distance between the dots is greater, and the shifted portions of the liquid A become continuous to form lines which are roughly semicylindrical in cross section, as demonstrated in Example 5-2 later explained; since this pattern includes these convex lines disposed over a substrate, it can, for example, be utilized for a stamp in printing with an electronic device. Also, provided that the liquid A is conductive, conductive lines can be formed. To form the semicylindrical shapes, the liquid A needs to repel the substrate at each liquid B-ejected portion; for example, the semicylindrical shapes are observed when the liquid A has a high static surface tension (40 mN/m or greater), the liquid B has a low static surface tension (25 mN/m or less) and the liquid A has a small layer thickness (several micrometers or less). Although it is possible that such repellency may not be exhibited if a highly adhesive material is used for the substrate, the glass slides used in Examples allowed semicylindrical shapes to be formed by means of repellency. Presumably, such temporarily-formed semicylindrical shapes will generally not have potential for utilization; however, with the use of an active energy ray-curable liquid as in the present invention, the shapes are fixable and therefore utilizable in a variety of ways.

Figure 1B:
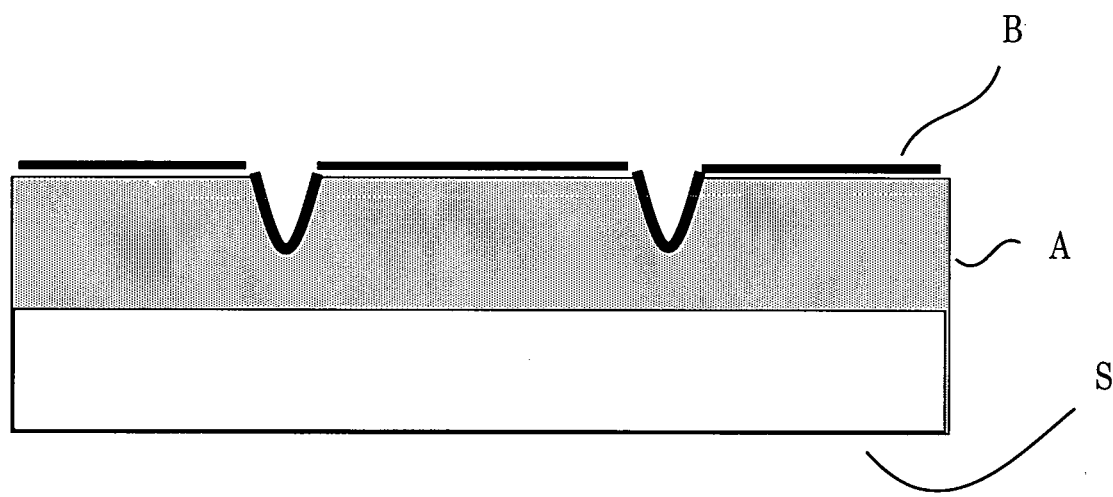
FIG. 1B is a schematic drawing showing a pattern having a periodic depression according to (2).
Figure 1C:
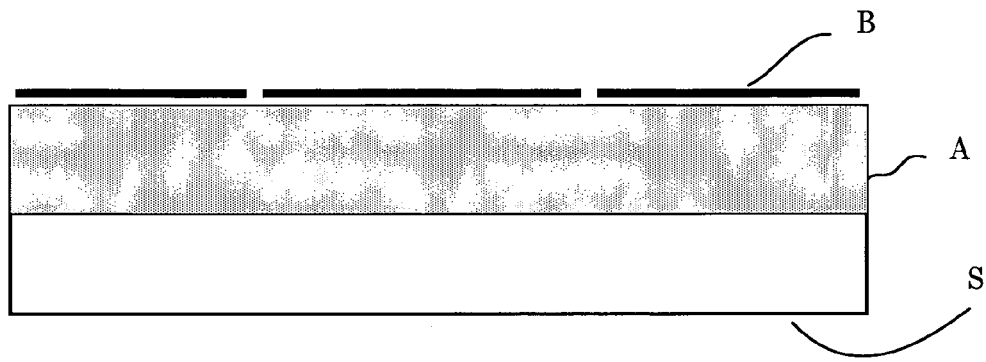
FIG. 1C is a schematic drawing showing a pattern in the form of a periodic flat surface according to (3).

FIG. 1A is a schematic drawing showing a state where the pattern according to (1) is formed when the liquid B has been ejected over the liquid surface of the liquid A. In FIGS. 1A to 1C, A denotes a layer of the liquid A, B denotes a layer of the liquid B, B' denotes en ejected droplet of the liquid B, and S denotes a substrate.

Firstly, the liquid A is applied over a flat substrate such as a glass plate to form a layer over the flat substrate. Subsequently, the liquid B containing a functional material such as a pigment is ejected over the layer of the liquid A by inkjet. By doing so, the pattern according to (1), where portions in the vicinities of the boundaries between liquid-ejected portions serve as convex portions, can be obtained. It has been confirmed in an cross-sectional observation that a layer containing the functional material thinly spreads over the layer of the liquid A. The layer containing the functional material spreads fairly uniformly, although it does not spread completely uniformly and tends to be thicker in the vicinity of the center.

As for energy with which the pattern according to (1) is formed, presumably the surface energy which the liquid A (with a high static surface tension) has is utilized rather than kinetic energy. This is because a sufficient amplitude with respect to a direction perpendicular to the liquid surface cannot be obtained when the liquid A has a low static surface tension, and it is not thought that such a smooth pattern having a periodic amplitude based upon a trigonometric function is formed with dissipating energy (e.g., kinetic energy), but thought that the ejection of the liquid B over the liquid A having a high static surface tension causes the layer of the liquid A to form into a round shape to reduce its own area. It is inferred that the uniform spreading of the functional material contained in the liquid B is due to pulling of the liquid B by the high static surface tension of the liquid A. The manner in which the liquid B spreads at high speed upon application of the liquid B in the form of single dots has been actually observed with a high-speed camera. Therefore, even if the liquid B is ejected in the form of discontinuous dots, a smooth shape can be obtained.

When the layer thickness of the liquid A is so thin as to be several micrometers or less, the amplitude of the pattern is larger than the layer thickness of the liquid A, which leads to an imperfect shape where the lower half of portions based upon a trigonometric function is cut off. Application of the active energy ray in this situation allows the pattern to be fixed, whereas application of the active energy ray when a certain amount of time (300 milliseconds or more) has passed after the ejection of the liquid B causes the amplitude to decrease and yields the pattern in the form of a periodic flat surface according to (3) as shown in FIG. 1C. In this case as well, the functional material layer of the liquid B thinly spreads over the liquid surface of the liquid A. It has been found that the rate at which the amplitude decreases becomes higher as the layer thickness of the liquid A becomes greater.

When the viscosity of the liquid A is fairly high, the pattern having a periodic depression according to (2) is formed as shown in FIG. 1B. Although details are unknown, it is presumed that this pattern is formed with a time (length of time spent after the ejection of the liquid B) which is somewhere between the time related to FIG. 1A and the time related to FIG. 1C. For example, in the case where the liquid B is ejected at 150 dpi×150 dpi, each depression is created at a point where the number of adjacent cells is largest.

To obtain this pattern, the flatness of the substrate matters. It is desirable that the substrate be made as smooth as possible and have an arithmetic mean roughness (Ra) of 1 µm or less. Regarding any of the patterns according to (1) to (4), the shape of the pattern is better organized as the smoothness of the substrate increases.

Figure 1D:
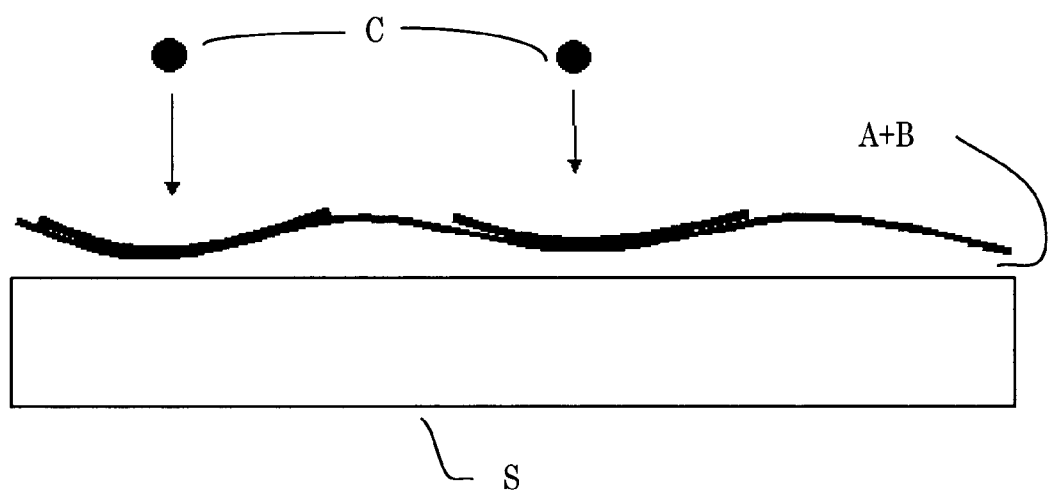
FIG. 1D is a schematic drawing showing a state where a functional material is placed in concave portions of a pattern according to (1).

Additionally, utilizing the concave portions of the pattern according to (1), droplets which contain a functional material may be further ejected such that the functional material is placed in the concave portions, as shown in FIG. 1D. In FIG. 1D, C denotes a functional material, S denotes a substrate, and A+B denotes a film where the pattern according to (1) is formed with the liquids A and B.

Figure 1E:
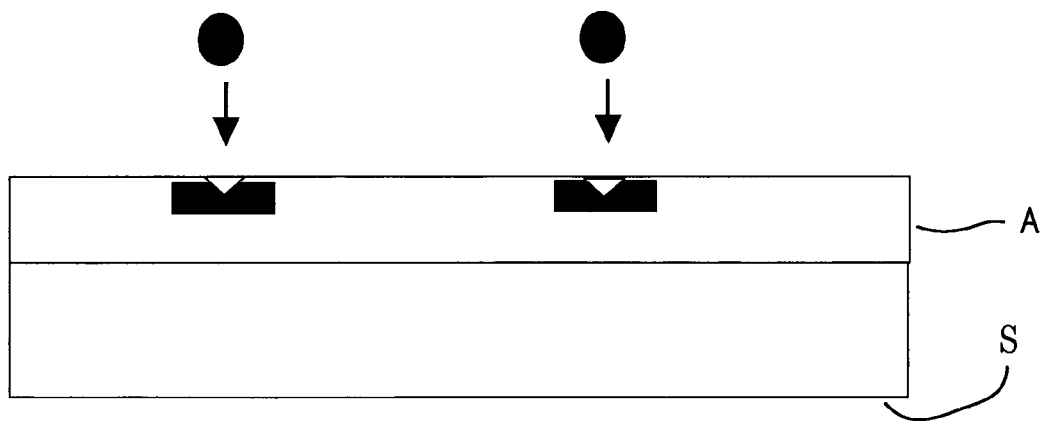
FIG. 1E is a schematic drawing showing a state where a liquid B has sunk into part of a liquid A.

In the case where the static surface tension of the liquid A is lowered by adding a surfactant, none of the patterns according to (1) to (3) are obtained. Specifically, as shown in FIG. 1E, the liquid B sinks into part of the liquid A, and thus a pattern where the liquid B spreads over the entire liquid surface of the liquid A cannot be obtained. In FIG. 1E, A denotes a layer of the liquid A, and S denotes a substrate.

Unlike this case, a pattern where a pigment spreads over the liquid surface of the liquid A enables the liquid A to have excellent pigment-shielding properties; therefore, even when droplets are ejected in an equal amount, it is possible to increase image density.

It should, however, be noted that the foregoing pattern is suitable for ejection of continuous dots but causes a colored image to spread to its surroundings because there are no dots alongside existing dots on the periphery of the image.

Figure 4:
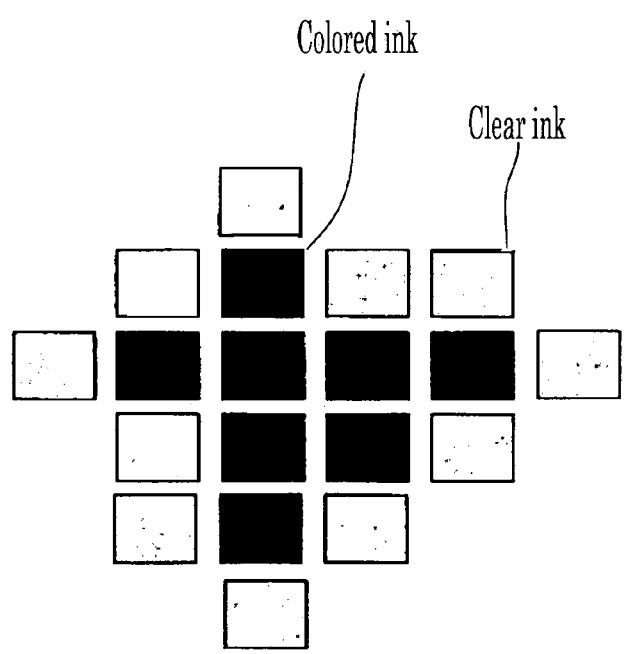
FIG. 4 is an explanatory drawing of a film wherein surroundings of a colored ink are covered with a clear ink.

Accordingly, by using a combination of a colored ink and a clear ink, with the clear ink being used for dots on the periphery of an image, bleeding on the periphery is caused by the clear ink and thus image bleeding can be prevented. Specifically, as shown in FIG. 4, since cells (formed by spreading of dots) do not encroach on adjacent cells, ideal pixels with high image density and without bleeding can be obtained as pixels produced by inkjet.

To enable the foregoing, there should not be a great difference in ejection time between the colored ink and the clear ink. And a skillful attempt, such as a change in ejection direction, is required. If this is impossible, the colored ink and the clear ink need to be conveyed and ejected at high speed such that the difference between the time at which the colored ink is attached and the time at which the clear ink is attached can be reduced. In practical testing, it was possible to form a cell pattern where there is a color difference between adjacent cells, provided that the difference in ejection time between adjacent dots is within 500 milliseconds.

According to the present inventions' examinations, the pattern according to (1) and (3) involve uniform spreading of the liquid B over the liquid surface of the liquid A; if the liquid B partially forms dots, a pattern having a large periodic amplitude cannot be formed.

Regarding the pattern according to (1), it is inferred that the liquid surface of the liquid A, which was a flat surface before the ejection of the liquid B, elastically deforms almost entirely by the ejection of the liquid B (becomes round due to the static surface tension of the liquid A), and that a line which connects adjacent concave portions has an amplitude based upon a trigonometric function.

Figure 2A:
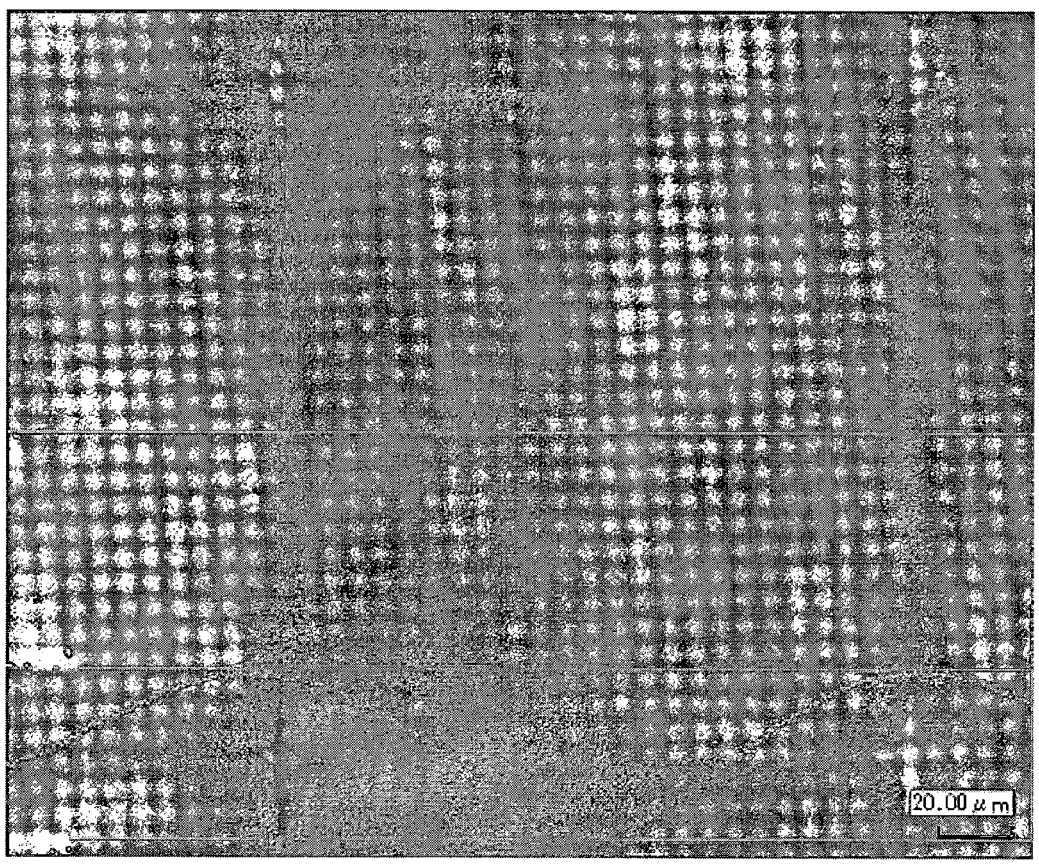
FIG. 2A is a photograph (taken with a laser microscope) of a film having a pattern according to (1) produced in Example 1; also.

The term "trigonometric function" herein stated means a curved line which approximates a trigonometric function. A practically formed pattern always includes noise, distortion, etc. to some extent and is therefore not purely a curve of a mathematical trigonometric function. Note that this term "trigonometric function" means an approximate sine wave, where liquid B-ejected portions serve as concave portions, the height of a convex portion lying between a concave portion and another concave portion adjacent to the concave portion (in other words the distance between the concave portion and the convex portion with respect to a direction perpendicular to the liquid surface) serves as the amplitude, and the distance between each liquid B-ejected portion with respect to a horizontal direction (in other words the distance related to the resolution at the time of liquid ejection) serves as the wavelength, based upon a cross-sectional measurement drawing (see FIG. 2A explained later). The approximate sine curve shown in FIG. 2A is observed as an actual surface shape. When seen from above, there is a pattern in the form of cells, with droplet-ejected portions being at their centers.

The difference between the pattern formed by the present invention and the pattern formed by an ordinary inkjet process is that the ejection of the liquid B over the liquid surface of the liquid A has an effect as far as a point close to the midpoint between a dot of the liquid B and another dot of the liquid B adjacent to the dot and, when seen from above, there is a cell pattern with dots being at centers. The effect is on virtually the entire liquid surface of the liquid A (except for parts to which the liquid B is not ejected), a line which connects dots has a period based upon a trigonometric function when cross-sectionally seen, and the state in which the liquid B has thinly spread over the liquid surface of the liquid A is fixed by the application of the active energy ray.

Here, it is thought that there is no complete connection between cells at the midpoints between the cells, and that a very narrow layer of the liquid A alone is present at each midpoint. There is a possibility that this narrow layer will, for example, be able to be utilized for producing electrodes with the distance of the electrodes being very short.

As just described, a pattern obtained by ejecting droplets over a liquid surface is generally a pattern which collapses as time passes and can form for a short period of time; note that a feature of the present invention is that fixation of the pattern by means of active energy ray-curable liquid(s) enables the pattern to be fixed as a semipermanent pattern.

Regarding the amplitude, the pattern according to (1) can be formed to have an amplitude of several micrometers or greater if the active energy ray is applied to perform curing, immediately after the ejection of the liquid B. If a pattern is fixed by applying the active energy ray when 300 milliseconds or more have passed after the ejection of the liquid B, the pattern has a fairly small amplitude (there is a cell pattern observed when seen from above). In the case where the liquid A has a low viscosity (50 mPas or less) and a high static surface tension (40 mN/m or greater), the pattern in the form of a periodic flat surface according to (3) is formed immediately (100 milliseconds or less) after the ejection of the liquid B. It is thought that the amplitude of the pattern decreases rather quickly.

Which of the patterns is desirable depends upon the intended purpose. Specifically, when the amplitude of a pattern is great, the pattern can be used, for example, as a concavo-convex pattern for decoration or as a base material in which to store a functional material at secured positions. When the amplitude is small, the pattern in the form of a periodic flat surface according to (3), where the liquid B thinly spreads over the liquid surface of the liquid A, can be obtained and used for decoration. In the case where the liquid B contains a colorant, the pattern in the form of a periodic flat surface according to (3), which is uniformly and thinly colored, can be formed. The present invention can be utilized for uniform application of any functional material, e.g., a charge-generating agent, besides the colorant.

The depth of the concave portions can be measured using a laser microscope. The pattern having a periodic depression according to (2) is not always observed; it is observed when the liquid A has a relatively high viscosity. Although the mathematical rationale for the formation of such depressions is still unknown, a pattern having a periodic protrusion with high accuracy can be formed. Note that the formation of the pattern according to (2) is affected by the smoothness of the substrate and the positional accuracy of ejected droplets. Formation of this pattern over a glass slide is possible but formation of this pattern over a paper surface is difficult.

Figure 1F:
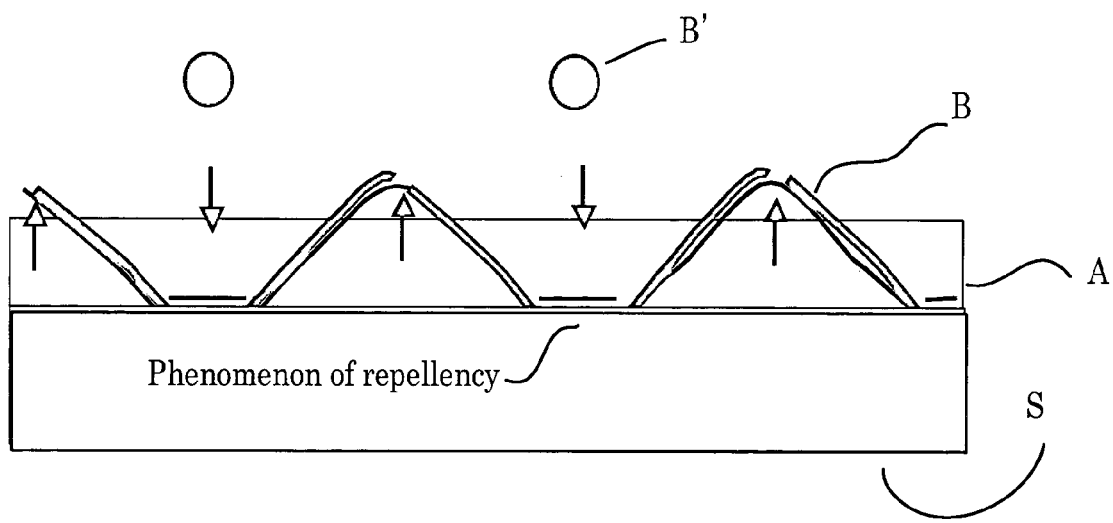
FIG. 1F is a schematic drawing showing a pattern having a periodic semicylindrical shape according to (4).

Next, the pattern having a periodic semicylindrical shape according to (4) has been observed in the case where the liquid A has a low viscosity (50 mPas or less), a high static surface tension (40 mN/m or greater) and a layer thickness of 10 μm or less. It is inferred that when the liquid A has a small layer thickness, a phenomenon of repellency is caused by the application of ejected droplets, and that when the distance between dots is short, the dots join in the form of a line and a semicylindrical shape is thus formed (FIG. 1F). This pattern, too, has potential for a variety of applications. In FIG. 1F, A denotes a layer of the liquid A, B denotes a layer of the liquid B, B' denotes a droplet of the liquid B, and S denotes a substrate.

Additionally, if the cell patterns according to (1) and (3) are each produced by thinly spreading the liquid B over the liquid surface of the liquid A and fixing the spread state of the liquid B by light application, the patterns may possibly be utilized to produce and fix monomolecular films such as LB films, provided that thinning of the films takes place to an extreme degree.

<Liquid A>

Provided that the liquid A is curable upon application of an active energy ray and changes in the shape of its liquid surface upon ejection of the liquid B over its liquid surface, and the changed shape can be fixed by application of the active energy ray, the liquid A is not particularly limited and may be suitably selected according to the intended purpose. Examples of the liquid A include materials used for UV inkjet and materials used in offset UV inks. Note that, to produce a pattern as in the present invention, the physical properties of the liquid A are limited.

Specifically, the liquid A contains an active energy ray-curable resin liquid and an initiator and may, if necessary, contain other components.

The active energy ray-curable resin liquid is not particularly limited and may be suitably selected according to the intended purpose, and examples thereof include radical photocurable resin liquids, cationic photocurable resin liquids and anionic photocurable resin liquids. Specific examples thereof as the radical photocurable resin liquids include a resin liquid obtained by adding a radical initiator to any radical reactive acrylic monomer/oligomer, and specific examples thereof as the cationic photocurable resin liquids include a resin liquid obtained by adding an acid-generating initiator to a cationic curable monomer/oligomer such as an alicyclic epoxy, oxetane or vinyl ether.

The initiator, too, is not particularly limited and may be suitably selected from known radical initiators and cationic initiators according to the intended purpose.

The radical initiators may be commercially available products, such as IRGACURE 127, 907, 184, 1173, 2959, 369, 379 and 754 (manufactured by Ciba Inc.). Preference is given to radical initiators which hardly turn yellow.

Specific examples of the cationic initiators include substituted aromatic sulfonium compounds that are acid-generating agents.

Note that if the static surface tension of the liquid A is lowered a great deal, none of the patterns in the present invention can be formed, so that it is preferable to make the amount of a surfactant small or add (almost) no surfactant. A small amount of a surfactant may be added to suppress spreading of dots to some extent.

The active energy ray means a light energy ray capable of polymerizing a reactive compound, such as an acrylate or oxetane, to which an initiator has been added, and examples of the active energy ray include ultraviolet rays, electron rays and visible beams. Among these, light of A BULB, single-color ultraviolet rays (having wavelengths of 365 nm, 385 nm, etc.) emitted with LEDs, and the like are particularly preferable in practical use.

The viscosity of the liquid A is not particularly limited in forming a cell pattern; note that whether the pattern according to (1) or the pattern according to (3) is formed depends upon the layer thickness of the liquid A and the length of time spent until the curing. To enable even the liquid A with a small layer thickness to be used, the viscosity of the liquid A at 25° C. is preferably in the range of 5 mPas to 10,000 mPas, more preferably 30 mPas to 1,000 mPas, although the viscosity may be suitably selected according to the intended purpose. It should, however, be noted that even when the liquid A has a low viscosity of less than 30 mPas, the pattern in the form of a periodic flat surface according to (3) can be formed, provided that the layer thickness of the liquid A is 10 μm or greater. In that case, since the pattern according to (1) quickly changes to the pattern according to (3), curing needs to be performed within 100 milliseconds after the ejection of the liquid B to obtain the pattern according to (3).

In the case where the liquid A, too, is applied by inkjet, the viscosity of the liquid A at the time when a head is heated is preferably 20 mPas or less, which enables the liquid A to be ejected through nozzles.

If the viscosity of the liquid A is very high, a pattern with a large amplitude may not be obtained. The pattern having a periodic depression according to (2) is obtained when the viscosity of the liquid A is relatively high (1,000 mPas or greater).

The viscosity can be measured at 25° C. using a rotary viscometer (TV22, manufactured by TOKI SANGYO CO., LTD.), for example.

When the static surface tension of the liquid B is less than 23 mN/m (at 25° C.), the static surface tension of the liquid A needs to be approximately 35 mN/m or greater, preferably approximately 37 mN/m or greater, at 25° C. to form a cell pattern. When the static surface tension of the liquid A is less than 35 mN/m, droplets of the liquid B ejected by inkjet spread less. When the static surface tension of the liquid A is far less than 35 mN/m, it is possible that the liquid B may not spread over the liquid surface of the liquid A but enter the liquid A to consequently form a dot pattern instead of a cell pattern as in Comparative Example 1 explained later. When the static surface tension of the liquid A is 30 mN/m or greater, but less than 35 mN/m, a pattern that is somewhere between a cell pattern and a dot pattern is formed, which is imperfect as a cell pattern. Parenthetically, the static surface tension of the liquid A is approximately 60 mN/m at most.

When the static surface tension of the liquid B is 23 mN/m or greater (at 25° C.), the liquid B spreads slowly over the liquid surface of the liquid A even if the same liquid A is used. Note that when the static surface tension of the liquid A is 40 mN/m or greater, the liquid B spreads to some extent even if the static surface tension of the liquid B is so high as to near 40 mN/m. In brief, the higher the static surface tension of the liquid A is and the lower the static surface tension of the liquid B is, the higher the speed at which the liquid B spreads over the liquid surface of the liquid A is.

—Substrate—

The liquid A is preferably applied over a substrate. The substrate is not particularly limited and may be suitably selected according to the intended purpose. Any substrate to which the liquid A can be fixed when cured can be used, and examples thereof include paper, films, glass, ceramic and metals.

In the case where paper is used, the liquid A performs a filling function even if plain paper, through which liquid easily permeates, is used.

Also, even if offset paper, through which liquid does not easily permeates and which poses a problem of drying with aqueous ink, is used, there is no problem because the method of the present invention employs curing with an active energy ray and drying. Note that whatever the cell pattern is, a smooth substrate is desirable for uniformization of the shape.

In the case where a film is used as the substrate, the surface thereof needs to be activated by corona treatment, etc. to allow the liquid A with a high surface tension to be applied over the surface.

<Liquid B>

The liquid B may be suitably selected according to the intended purpose and is preferably an active energy ray-curable liquid capable of forming a pattern over the liquid surface of the liquid A. As in the case of the liquid A, the liquid B may be of radical type, cationic type or anionic type. If image formation is intended, a pigment or a dye is contained as a colorant in the liquid B.

Also, other functional materials may be contained in the liquid B according to the intended purpose. For production of a photoconductor, a photoelectric conversion device or a solar battery, for example, a dispersion liquid of a charge-generating material (such as a phthalocyanine pigment) is used. It is thought that addition of a conductive material to the liquid B makes it possible to form electrodes with the distance between the electrodes being short. Also, even if the liquid B is not an active energy ray-curable liquid, the liquid B is effective for thinly spreading a functional material, provided that the liquid B is an oily liquid containing a functional material and has a sufficiently low surface tension. In that case, to make the final form solid, it is particularly preferred that the oily liquid have a low boiling point.

The method of the present invention makes it possible to form the pattern according to any one of (1) to (4) by an inkjet process. The pattern according to (1) is effective as a place to store any functional material in.

The viscosity of the liquid B is adjusted to such a range as enables the liquid B to be ejected by inkjet. Generally, it is preferred that the viscosity of the liquid B be 20 mPas or less at the temperature of the liquid B when ejected with heating. The viscosity is not limited in the case of an inkjet process which enables a high-viscosity liquid to be ejected. Generally, the viscosity of the liquid B at 25° C. is preferably in the range of 5 mPas to 100 mPas, more preferably 10 mPas to 60 mPas. Note that, with a head which allows heating up to 130° C. or so, even the liquid B having a rather high viscosity at room temperature can be ejected as well.

The static surface tension of the liquid B is not particularly limited and may be suitably selected according to the intended purpose; it is preferably in the range of 15 mN/m to 35 mN/m at 25° C.

To form a curve based upon a trigonometric function, where the liquid B spreads over the liquid surface of the liquid A and the curve as a whole has an amplitude, it is preferred that the static surface tension of the liquid A (at 25° C.) be greater than that of the liquid B (at 25° C.). What is certain at the moment is that when the static surface tension of the liquid A is lowered to less than 30 mN/m with the addition of a surfactant, none of the patterns according to (1) to (3) can be formed.

Also, the density of the liquid A and the density of the liquid B are preferably close to each other. If the density of the liquid B is far higher than that of the liquid A, it is deemed difficult to form a cell pattern. It should, however, be noted that even when the liquids A and B do not differ much in density, addition of a surfactant makes it difficult to form a cell pattern (although a cell pattern may be formed before the addition of the surfactant).

When the densities of the liquids A and B are in the approximate range of 1.0 g/cm$^3$ to 1.2 g/cm$^3$ at 25° C., the presence or absence of any of the patterns is seemingly not much affected by the densities; it is inferred that this is because the size of droplets is very small and thus the static surface tension has a greater effect than gravity does.

Parenthetically, although an active energy ray-curable material is preferably used for the liquid B in the present invention, a thermosetting material, as well as the active energy ray-curable material, may possibly make it possible to obtain any of the patterns.

As the inkjet process by which the liquid B is ejected, both a piezoelectric inkjet process and a thermal inkjet process are usable. Preference is given to a piezoelectric inkjet process because it allows the liquid B having a relatively high viscosity to be ejected. Additionally, a pattern may be used in a selective manner according to the intended purpose, provided that the pattern is used for decoration.

By pattern formation with change in at least one of the periods of ejected droplets of the liquid B with respect to the X-axis and Y-axis directions, it is possible to obtain a variety of geometric patterns with periodic concavo-convex shapes. The adjustment of the period(s) can be made, for example, by periodically changing the resolution(s) of the pattern-forming liquid B (applied by inkjet) with respect to a main scanning direction and/or a sub-scanning direction.

When the liquid B is ejected as dots with fixed periods with respect to the X-axis and Y-axis directions, a pattern in the form of quadrilateral cells is obtained. When the liquid B is ejected at resolutions of X dpi and Y dpi with respect to the X-axis and Y-axis directions respectively, it is thought that a pattern in the form of quadrilateral cells each having a size of 1/X inch and 1/Y inch is obtained.

When the resolutions of the liquid B ejected are 150 dpi×150 dpi (170 μm in width) or 300 dpi×300 dpi (85 μm in width), for example, there is no problem. When the resolutions of the liquid B ejected are 1,200 dpi×1,200 dpi (21 μm in width), for example, the width is close to the size of a droplet (7 pL=20 μm), and thus it is difficult to form a pattern in terms of the accuracy of the positions where the liquid B is ejected. To form a pattern stably, it is preferred that the diameter of an ejected droplet be 0.4 or less times the distance between ejected dots.

Calculations show that when the resolutions are 150 dpi×150 dpi and the mass of one droplet is 8 ng, the ratio of the diameter of a dot to the length of one side of a cell (diameter/length) is 0.14 and the height of a layer of the liquid B containing a functional material is approximately 0.3 μm; when the resolutions are 300 dpi×300 dpi, the ratio of the diameter of a dot to the length of one side of a cell (diameter/length) is 0.28 and the height of a layer of the liquid B containing a functional material is approximately 1 μm; and when the resolutions are 1,200 dpi×1,200 dpi, the ratio of the diameter of a dot to the length of one side of a cell (diameter/length) is 1.13 and the height of a layer of the liquid B containing a functional material is approximately 16 μm.

To form the pattern according to (1), in other words to perform curing and fixation with the amplitude of a pattern remaining large, it is preferable to apply the active energy ray within 300 milliseconds, particularly preferably when 0.1 milliseconds to 100 milliseconds have passed, after the ejection of droplets of the liquid B. Note that decrease in amplitude takes place more slowly, as the viscosity of the liquid A increases, the distance between dots lengthens, the static surface tension of the liquid A decreases and the layer thickness of the liquid A decreases. In some cases, an amplitude remains even when several seconds have passed.

To form the pattern according to (3), in other words when a cell pattern having a small amplitude is required, it is preferable to apply the active energy ray when 300 milliseconds or more, particularly preferably 300 milliseconds to several seconds, have passed after the ejection of droplets of the liquid B. Note that decrease in amplitude takes place more quickly, as the viscosity of the liquid A decreases, the distance between dots shortens, the static surface tension of the liquid A increases and the layer thickness of the liquid A increases. When the liquid A has a viscosity of 50 mPas or less at 25° C. and a static surface tension of 40 mN/m or greater at 25° C., a cell pattern in the form of a periodic flat surface is formed within 100 milliseconds after the ejection of droplets of the liquid B.

When the layer thickness of the liquid A is several micrometers or less, the pattern according to (1) collapses, and an imperfect shape, which appears as if a lower side of a curve based upon a trigonometric function is cut flat, is formed.

The pattern according to (2) is not always formed; it is formed when the viscosity of the liquid A is fairly high. Note that even when its viscosity is low, an increase in the accuracy of the positions where the liquid B is ejected may possibly make it possible to form this pattern. Also, when the pattern has depressions, what appear to be protrusions are seen in the depressions in some cases.

In any case, it is preferred that the liquid B be cured so quickly as to enable the curing to be completed in a predetermined period of time during which the active energy ray is applied.

The present invention allows the pattern according to (1), which collapses within 1 second without the application of the active energy ray, to be semipermanently sustained by curing the pattern with the application of the active energy ray and thus fixing the pattern. The foregoing technique can be utilized for formation of a cell pattern by an inkjet process, without the need to change the technique in any way; it should also be noted that concave portions formed in the pattern are effective in storing a functional material (which is provided to the concave portions at a later time) at intended positions.

A functional material can be contained in the liquid B, and it is advisable to eject this functional material over a periodic pattern according to a predetermined signal.

In the case of use for an image, a colorant is contained as the functional material in the liquid B. Also, when a functional material other than a colorant is contained in the liquid B, it is possible to thinly provide a film of the functional material over the entire liquid surface of the liquid A. The functional material is not particularly limited, provided that it can be contained in the liquid B.

Note that each of the liquids A and B may be composed of an active energy ray-curable resin liquid and an initiator/surfactant, without a functional material (such as a colorant) added thereto, and a functional material may be separately ejected over a cured film having the pattern according to (1). The film surface has concave portions and convex portions, and application of the functional material to the concave portions makes it possible to improve the stability of the positions where the functional material is ejected.

<Functional Material>

The functional material is not particularly limited and may be suitably selected according to the intended purpose. Examples thereof include a colorant, a hole conductive material, a light-emitting material, a photocharge-generating material and a biomaterial.

When the liquid B contains a colorant, a colored pattern can be formed. The colorant is not particularly limited and may be suitably selected according to the intended purpose, and examples thereof include an oily dye, a pigment and titanium oxide.

Examples of the oily dye include oily inks for inkjet, and oily dyes used for solid inks.

As the pigment, any pigment used for an ordinary inkjet ink can, for example, be used. Typical examples of black pigments include carbon black, typical examples of magenta pigments include quinacridone pigments, typical examples of cyan pigments include phthalocyanine pigments, and typical examples of yellow pigments include azo pigments. Additionally, the surface of the pigment may be processed such that the pigment can easily be dispersed in an organic solvent. Generally, the pigment is dispersed in an ultraviolet-curable resin liquid with a dispersant. Typical examples of inorganic pigments include titanium oxide.

Use of a colorant as the functional material is effective in forming an image, for which inkjet is originally intended. For example, as in related art, if a colored ink does not spread over a pre-coated surface, fusion of dots is prevented and dots are reduced in radius; in this case, a very large number of dots are required to print a solid image portion. Meanwhile, as in the present invention, when a colored ink is ejected over a formed cell pattern, the areas of cells are surely colored and bleeding does not occur beyond each cell; therefore, it is possible to accurately give the colorant to necessary areas only.

Also, when ejected droplets themselves, used for forming a cell pattern, serve as a colorant, it is effective in forming a solid image because the colorant spreads over the entire surface. Spreading of single dots can be adjusted by adjusting the length of time spent after the ejection of the liquid B and until the curing, or by finely adjusting the static surface tension of the liquid A.

When single dots are not used, the size of cells can be adjusted by adjusting the resolution of the liquid B at the time when the liquid B is ejected in the process of forming the cells. In that case, attention should be paid to the fact that the colorant spreads to some extent at an edge alongside which there are no dots.

When the liquid B is ejected such that the minimum area of each ejected portion becomes a quadrilateral, a concavo-convex pattern in the form of quadrilaterals can be obtained, and various other patterns can be formed as well. Also, a pattern with a periodic shape of an n-gon (n=3, 4 or 6) can be formed. Further, with change in the periods of the ejected liquid B with respect to the X-axis and Y-axis directions, it is possible to obtain a variety of concavo-convex shapes.

Any such periodic shape is useful, for example, for three-dimensional printed matter such as wallpaper.

Examples of the hole conductive material include hole transfer agents, such as triphenylamine-based materials, used for organic electroluminescence elements, etc. The present invention is effective in uniformly and thinly forming any such material by an inkjet process. Also, in the case where any such material is further ejected over a fixed pattern with concave portions, the present invention is effective in producing an electronic device because the accuracy of the positions where it is ejected is surely secured.

Examples of the light-emitting material include light-emitting materials of organic electroluminescence elements.

Examples of the photocharge-generating material include charge-generating materials such as phthalocyanine and amorphous silicon. The present invention is effective in meeting a demand for uniform application of a charge-generating material (used for an electrophotographic photoconductor, a solar battery, etc.) by an inkjet process.

Examples of the biomaterial include a material utilizable as a base material with which an antigen, used in producing an allergy-testing chip, can be ejected to secured positions.

—Uses—

The present invention's method of producing a film can, for example, be used as an inkjet process to produce an organic electroluminescence element, a solar battery, an organic thin-film transistor, a liquid-crystal color filter, etc. Also, the present invention is effective in producing a biochip, an allergy-testing chip, etc. by an inkjet process. It goes without saying that the present invention is effective in forming ideal pixels, with a colorant uniformly spread, as an ordinary inkjet recorded image. Note that, to prevent too much spreading of single dots, it is necessary to apply a clear ink for dots on the periphery or adjust the static surface tension of the liquid A such that the single dots spread in a predetermined amount, for example.

Figure 9:
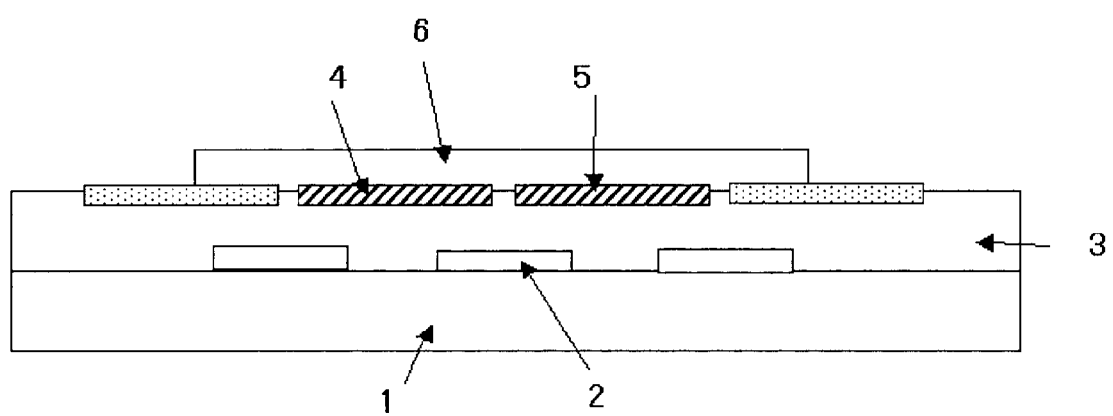
FIG. 9 is a creative drawing of an organic transistor utilizing a pattern in the form of a periodic flat surface according to (3).

Regarding a proposal of use of the present invention, the potential for application of the present invention to an organic transistor is now explained referring to FIG. 9.

FIG. 9 is a conceptual drawing of a bottom-gate top-contact organic transistor. The reference numeral 1 denotes a substrate, the reference numeral 2 denotes a gate electrode, the reference numeral 3 denotes a gate insulating film, the reference numeral 4 denotes a source electrode, the reference numeral 5 denotes a drain electrode, and the reference numeral 6 denotes an organic semiconductor film.

The substrate 1 is not particularly limited, provided that it is insulative and can support a field-effect transistor and support a display element, a display panel, etc. provided over the field-effect transistor. The gate electrode 2 is not particularly limited, provided that it is conductive; examples thereof include conductive paste, a mixture of a nanometal and powder of any of gold, silver, palladium and copper, a mixture of a nanometal and alloy powder of silver and palladium, and organic conductive materials such as poly(3,4-ethylenedioxythiophene) (PEDOT) prepared by doping p-toluenesulfonic acid (TsO), and PEDOT prepared by doping polystyrenesulfonic acid (PSS). The gate electrode 2 is formed, for example, by a screen printing method, an inkjet process or a vapor deposition method.

Presumably, the present invention can be applied to production of the gate insulating film, the source electrode and the drain electrode over this gate electrode. Specifically, an ultraviolet-curable liquid (liquid A) serving as an insulating material is applied over the gate electrode 2 and the liquid B containing a material for electrodes is ejected over the liquid surface of the liquid A by inkjet. On that occasion, the static surface tension of the liquid A is made higher than that of the liquid B to allow the liquid B to spread thinly as a cell pattern over the liquid surface of the liquid A.

As the material for the liquid A, a material which exhibits high insulating capability after cured is preferable. The liquid B is not particularly limited, provided that it is a liquid containing a conductive material; it should, however, be noted that the liquid B needs to have low resistance after being spread over the liquid surface of the liquid A and then dried, and a coating material prepared by dispersing PEDOT and PSS in a low-boiling-point alcoholic solvent is deemed suitable for inkjet ejection. The surface tension of the liquid B needs to be made lower than that of a photocurable liquid containing an insulating material as the liquid A.

Further, over the liquid B, a film of an organic semiconductor is formed by inkjet or spin coating. Known examples of the organic semiconductor include high-molecular materials, low-molecular materials such as pentacene and rubrene, and materials for which precursors are used.

It is presumed that the foregoing makes it possible to form an organic transistor with the distance between a source electrode and a drain electrode being very short.

The following explains the mechanism of the present invention by supposition.

Conditions for the formation of any of the patterns in the present invention are determined depending primarily upon the difference in static surface tension between the liquid A and the liquid B. The greater this difference is (the larger the static surface tension of the liquid A is than that of the liquid B), the more easily the liquid B spreads over the liquid surface of the liquid A, and one of the patterns (cell patterns) according to (1) to (3) is formed. When the difference is small or when the static surface tension of the liquid A is smaller than that of the liquid B, the liquid B enters the liquid A, remaining in the shape of spheres, and is surrounded by the liquid A (a dot pattern is formed). Therefore, the size of image dots can be reduced by reducing the difference in static surface tension between the liquids A and B. The difference in static surface tension can be adjusted by adding a surfactant in a small amount of 1% by mass or less to the liquid A (although this varies depends upon the type of the surfactant).

Also, the length of time during which the pattern having a periodic amplitude based upon a trigonometric function according to (1) decreases in amplitude and becomes the pattern in the form of a periodic flat surface according to (3) becomes shorter as the viscosity of the liquid A lowers and the layer thickness of the liquid A increases.

Generally, the time constant of the amplitude of a wave generated over a liquid surface is calculated in accordance with the following scaling law: $\tau$ (time constant)$=\eta\lambda^4/(\gamma e_0^3)$ (decrease in amplitude takes place more quickly as the viscosity $\eta$ becomes lower, the distance $\lambda$ between dots becomes shorter, the static surface tension $\gamma$ becomes greater and the layer thickness $e_0$ becomes greater). Although whether this applies to the case where a liquid is ejected over a liquid surface as in the present invention is unknown, it is thought that a similar rule will apply to that case.

Also, it is thought that the critical layer thickness ($e_c$) of a liquid film, related to repellency of the liquid film against a substrate, can be calculated according to Equation 1 below. The term "critical layer thickness" means that when the layer thickness of the liquid film is smaller than or equal to the critical layer thickness, the liquid film repels the substrate.

The after-mentioned liquid A-9 having a great static surface tension easily exhibits repellency and makes it difficult to obtain a pattern in the form of a periodic flat surface with a small layer thickness, although this may not be consistently true as the present invention involves sizes smaller than the length of a capillary. To obtain a pattern in the form of a periodic flat surface with a small layer thickness, it is preferable to use the after-mentioned liquid A-10 or liquid A-5 ($\gamma=38$) having an appropriate static surface tension, lower the static surface tension of the liquid B (25 mN/m or less), and apply the active energy ray when a long period of time (300 milliseconds or more) has passed after the ejection of the liquid B.

$$e_c = 2k^{-1}\sin\left(\frac{\theta_E}{2}\right) \qquad \text{Equation 1}$$

When $\theta_E \ll 1$, the equation $e_c = k^{-1}\theta_E$ applies.

(In Equation 1, $e_c$ denotes a critical layer thickness, denotes a characteristic value referred to as "capillary length" represented by Equation 2 below, and $\theta_E$ denotes a contact angle.)

$$k^{-1} = \sqrt{\frac{\gamma}{\rho g}} \qquad \text{Equation 2}$$

(In Equation 2, $\gamma$ denotes a static surface tension, $\rho$ denotes a density of a liquid, and g denotes a gravitational acceleration.)

The mechanism for the formation of the pattern having a periodic depression according to (2) is unknown.

It is not clear why a pattern having overlaps of adjacent dots and having convex portions between respective dot centers, formed when 300 milliseconds or less have passed after the ejection of the liquid B, changes to a pattern with depressions, formed when approximately 1 second has passed after the ejection of the liquid B. Additionally, protrusions are observed in the depressions in some cases. It is thought that when a long period of time has passed after the ejection of the liquid B, the pattern in the form of a periodic flat surface according to (3) is formed in any case, and that, as an intermediate process, a specific shape is temporarily formed at a portion where four dots overlap. Such a specific shape generally disappears but can be fixed by application of an ultraviolet ray provided that an ultraviolet-curable material is used therefor, which is interesting.

Figure 6:
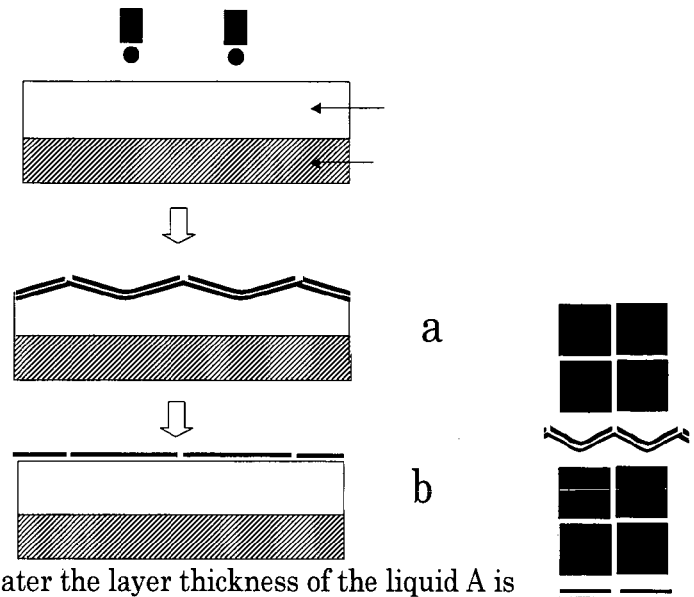
FIG. 6 is a schematic drawing showing how a periodic semicylindrical shape is formed.
Figure 6:
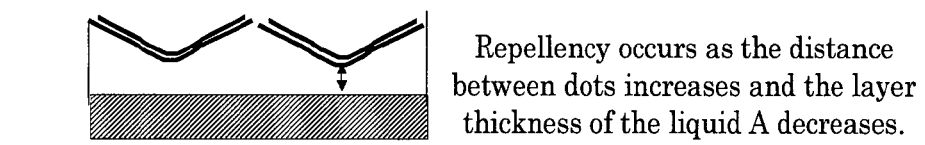
Figure 6:
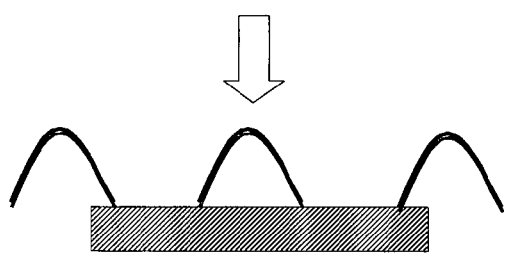
Figure 6:
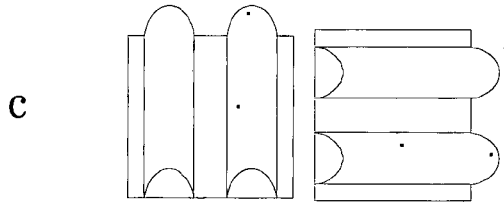

The schematic drawing of FIG. 6 shows the pattern with an amplitude according to (1) formed after the ejection of the liquid B, the pattern in the form of a periodic flat surface according to (3) formed as time passes, and a pattern having a periodic semicylindrical shape, formed by repellency of the liquid A in the case where the liquid A has a small layer thickness, a great static surface tension and a low viscosity. In FIG. 6, the letter a denotes a cell pattern having a periodic amplitude with respect to a longitudinal direction, the letter b denotes a cell pattern in the form of a periodic flat surface, and the letter c denotes a cell pattern having a periodic semicylindrical shape.

Figure 7:
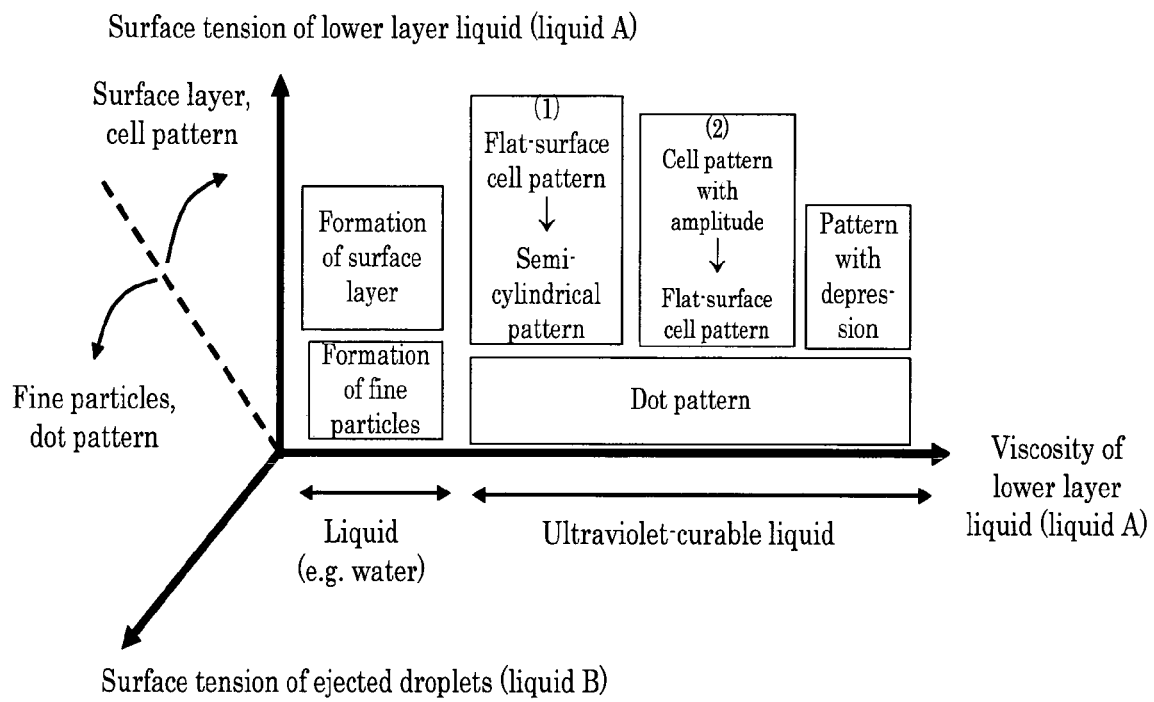
FIG. 7 is a diagram showing pattern classifications in the case where a liquid B is constant and the viscosity of a liquid A is plotted on the horizontal axis.

Next, pattern classifications in the case where the liquid B is constant and the viscosity of the liquid A is plotted on the vertical axis are shown in FIG. 7. Note that FIG. 7 shows rough classifications based upon data of the present invention itself; in reality, though, dot patterns have a variety of minute structures and cell patterns in the form of flat surfaces, too, have a variety of minute structures. Also, in the present experiment, a glass slide is primarily used as the substrate; note that the minute structure obtained varies depending upon the substrate as well. Also in FIG. 7, (1) specifically refers to formation of a cell pattern in the form of a periodic flat surface when a short period of time has been spent after the ejection of the liquid B, and formation of a pattern having a periodic semicylindrical shape when the layer of the liquid A is thin, and (2) specifically refers to formation of a cell pattern having a periodic amplitude, and formation of a cell pattern in the form of a periodic flat surface when a long period of time has been spent after the ejection of the liquid B.

In the case where an ultraviolet-curable liquid is used, a dot pattern where the liquid B enters the liquid A is formed when the static surface tension of a layer of the liquid A as an underlayer is low (due to addition of a surfactant), whereas a cell pattern where the liquid B spreads over the liquid A is formed when the static surface tension of the liquid A is large. When the liquid A has a high viscosity and does not have a very great layer thickness, a pattern with a longitudinal amplitude lasts for a long period of time, and the transition from this pattern to a cell pattern in the form of a periodic flat surface takes a lot of time. When the liquid A has a low viscosity, a high static surface tension and a great layer thickness, a cell pattern in the form of a periodic flat surface is quickly formed; if, in this case, the liquid A has a small layer thickness, it exhibits repellency and a pattern having a semicylindrical shape is thus formed.

In the case where the liquid A is not an ultraviolet-curable material but water that is lower in viscosity, the liquid B spreads over the water surface and cures, provided that the static surface tension of the water is great. When the static surface tension of the water is small, the liquid B enters the water and fine particles are formed in the water by curing with an ultraviolet ray.

Note that the smaller the static surface tension of the liquid B is, the more easily the liquid B spreads over the liquid surface of the liquid A.

A film which has the pattern having a periodic semicylindrical shape according to (4) is thought to be able to be applied to a lenticular lens.

The term "lenticular" refers to printed matter which gives a stereoscopic sense or allows a picture to change in some way depending upon the angle from which it is seen using a lenticular lens. The lenticular varies in size from a small one of several square centimeters to a large one such as a billboard attached to a wall surface of a building. It can also be used for a three-dimensional display of glasses-free type. Provided that colorant-free transparent materials are used for both the liquids A and B, the present invention can be suitably utilized for production of a lenticular lens, and presumably the lenticular lens can be produced by a very simple inkjet process.

EXAMPLES

The following explains the present invention in further detail, referring to Examples. It should, however, be noted that the scope of the present invention is not confined to these Examples.

For inkjet ejection, a self-made piezoelectric apparatus was used, and a liquid B was heated to 40° C. to 60° C. and made to have such a viscosity as allowed the liquid B to be ejected. Using a metal halide lamp (A BULB, manufactured by Integration Technology Ltd.), an active energy ray was applied with an intensity that was sufficient for curing, and a cured film having an intended shape was produced. As a laser microscope, VK9500 (manufactured by KEYENCE CORPORATION) was used. Static surface tension, viscosity and density were measured as follows.

<Static Surface Tension>

The static surface tension was measured at 25° C. using a static surface tension measuring apparatus (Model CBVP-Z, manufactured by Kyowa Interface Science Co., Ltd.).

<Viscosity>

The viscosity was measured at 25° C. using a rotary viscometer (TV22, manufactured by Toki Sangyo Co., Ltd.).

<Density>

The density was measured using a weighing bottle for density measurement.

<Preparation of Liquid A and Liquid B>

The materials shown in Tables 1-1A and 1-1B and Table 2-1 were mixed and agitated to prepare active energy ray-curable liquids (Liquids A: Liquids A-1 to A-8) and active energy ray-curable liquids (Liquids B: Liquids B-1 to B-4). The liquids B which contained pigments were prepared using a known fine milling apparatus (DYNO-MILL).

Physical properties of the liquids A and B are shown in Tables 1-2 and 2-2 respectively.

Liquid A (Primer)

TABLE 1-1A

|  | Polymerizable compound | Polymerizable compound | Initiator | Surfactant |
|---|---|---|---|---|
| A-1 | Polyethoxylated tetramethylolmethane tetraacrylate (Product name: NK ESTER ATM35E, manufactured by Shin Nakamura | | Photoinitiator (Product name: IRGACURE 379, manufactured by Ciba Specialty Chemicals plc), | Not used |

TABLE 1-1A-continued

| | Polymerizable compound | Polymerizable compound | Initiator | Surfactant |
|---|---|---|---|---|
| | Chemical Co., Ltd.), 100 parts by mass | | 3 parts by mass | |
| A-2 | Polyethoxylated tetramethylolmethane tetraacrylate (Product name: NK ESTER ATM35E, manufactured by Shin Nakamura Chemical Co., Ltd.), 100 parts by mass | | Photoinitiator (Product name: IRGACURE 379, manufactured by Ciba Specialty Chemicals plc), 3 parts by mass | Product name: BYK-UV3510 manufactured by BYK Japan KK, 1 part by mass |
| A-3 | (2-methyl-2-ethyl-1,3-dioxolan-4-yl)methyl acrylate (Product name: MEDOL-10, manufactured by OSAKA ORGANIC CHEMICAL INDUSTRY LTD.), 70 parts by mass | Dendritic acrylate (Product name: VISCOAT #1000, manufactured by OSAKA ORGANIC CHEMICAL INDUSTRY LTD.), 30 parts by mass | Photoinitiator (Product name: IRGACURE 379, manufactured by Ciba Specialty Chemicals plc), 10 parts by mass | Not used |
| A-4 | (2-methyl-2-ethyl-1,3-dioxolan-4-yl)methyl acrylate (Product name: MEDOL-10, manufactured by OSAKA ORGANIC CHEMICAL INDUSTRY LTD.), 70 parts by mass | Dendritic acrylate (Product name: VISCOAT #1000, manufactured by OSAKA ORGANIC CHEMICAL INDUSTRY LTD.), 30 parts by mass | Photoinitiator (Product name: IRGACURE 379, manufactured by Ciba Specialty Chemicals plc), 10 parts by mass | Product name: BYK-UV3510 manufactured by BYK Japan KK, 1 part by mass |

Liquid A (Primer)

TABLE 1-1B

| | Polymerizable compound | Polymerizable compound | Initiator | Surfactant |
|---|---|---|---|---|
| A-5 | Acrylic acid ester of dipentaerythritol caprolactone (Product name: KAYARAD DPCA-60, manufactured by Nippon Kayaku Co., Ltd.), 100 parts by mass | | Photoinitiator (Product name: IRGACURE 379, manufactured by Ciba Specialty Chemicals plc), 3 parts by mass | Not used |
| A-6 | Acrylic acid ester of dipentaerythritol caprolactone (Product name: KAYARAD DPCA-60, manufactured by Nippon Kayaku Co., Ltd.), 100 parts by mass | | Photoinitiator (Product name: IRGACURE 379, manufactured by Ciba Specialty Chemicals plc), 3 parts by mass | Product name: BYK-UV3510, manufactured by BYK Japan KK, 0.13 parts by mass |
| A-7 | Acryloylmorpholine (Product name: ACMO, manufactured by KOHJIN Co., Ltd.), 100 parts by mass | | Photoinitiator (Product name: IRGACURE 379, manufactured by Ciba Specialty Chemicals plc), 3 parts by mass | Not used |
| A-8 | Acryloylmorpholine (Product name: ACMO manufactured by KOHJIN Co., Ltd.), 100 parts by mass | | Photoinitiator (Product name: IRGACURE 379, manufactured by Ciba Specialty Chemicals plc), 3 parts by mass | Product name: BYK-UV3510, manufactured by BYK Japan KK, 0.3 parts by mass |

Physical Properties of Liquid A

TABLE 1-2

| | Static surface tension (mN/m) (25° C.) | Viscosity (mPas) (25° C.) | Density (g/cm$^3$) (25° C.) |
|---|---|---|---|
| A-1 | 43 | 357 | 1.127 |
| A-2 | 21 | 364 | 1.128 |
| A-3 | 32 | 21 | 1.084 |
| A-4 | 22 | 22 | 1.083 |
| A-5 | 38 | 1,222 | 1.134 |
| A-6 | 24 | 1,361 | 1.133 |
| A-7 | 45 | 11 | 1.112 |
| A-8 | 22 | | |

Liquid B (Ejection Liquid)

TABLE 2-1

| | Polymerizable compound | Polymerizable compound | Initiator | Pigment | Other additives |
|---|---|---|---|---|---|
| B-1 | Radical reactive acrylate, 80 parts by mass to 90 parts by mass | | Radical generator, 5% to 10% | Carbon black, 1% to 5% | Ester-based organic solvent, 1% to 5% |
| B-2 (Same as A-3) | (2-methyl-2-ethyl-1,3-dioxolan-4-yl)methyl acrylate (Product name: MEDOL-10, manufactured by OSAKA ORGANIC | Dendritic acrylate (Product name: VISCOAT #1000, manufactured by OSAKA ORGANIC CHEMICAL INDUSTRY LTD.), | Photoinitiator (Product name: IRGACURE 379, manufactured by Ciba Specialty Chemicals plc), 10 parts by mass | Not used | Not used |

TABLE 2-1-continued

| | Polymerizable compound | Polymerizable compound | Initiator | Pigment | Other additives |
|---|---|---|---|---|---|
| | CHEMICAL INDUSTRY LTD.), 70 parts by mass | 30 parts by mass | | | |
| B-3 | Propoxylated neopentylglycol diacrylate (CAS 84170-74-1), 70 parts by mass | Acrylic acid ester of dipentaerythritol caprolactone (CAS 89800-10-2), 10 parts by mass | Mixture of radical generators (Product names: IRGACURE 374, IRGACURE 189 and DAROCUR TPO, manufactured by Ciba Specialty Chemicals plc) 10 parts by mass | Carbon black, 7 parts by mass | Hyperdispersant polymer (Product name: SOLSPERSE 32000, manufactured by Avecia), 3 parts by mass |
| B-4 | Propoxylated neopentylglycol diacrylate (CAS 84170-74-1), 76 parts by mass | Acrylic acid ester of dipentaerythritol caprolactone (CAS 89800-10-2), 10 parts by mass | Mixture of radical generators (Product names: IRGACURE 374, IRGACURE 189 and DAROCUR TPO, manufactured by Ciba Specialty Chemicals plc) 10 parts by mass | Carbon black, 3 parts by mass | Hyperdispersant polymer (Product name: SOLSPERSE 32000, manufactured by Avecia), 1 part by mass |

Physical Properties of Liquid B

TABLE 2-2

| | Static surface tension (mN/m) (25° C.) | Viscosity (mPas) (25° C.) | Density (g/cm$^3$) (25° C.) |
|---|---|---|---|
| B-1 | 23 | 20.37 | 1.064 |
| B-2 (Same as A-3) | 32 | 21 | 1.084 |
| B-3 | 32 | 54 | 1.064 |
| B-4 | 32 | 41 | 1.047 |

Example 1

Over a glass slide, a liquid A-1 was applied by coating so as to form a layer of approximately 15 µm in thickness. Subsequently, a liquid B-1 was ejected over the liquid surface of the liquid A-1 under the following conditions, using the above-mentioned apparatus for ejection.
—Ejection Conditions—
Resolution: 150 dpi (with respect to the X-axis direction), 150 dpi (with respect to the Y-axis direction)
Line-type one-pass printing with nozzles in one line
Heated to 40° C., the liquid B-1 was ejected. The size of one droplet was adjusted to 7 pL, and the ejection speed of droplets was set at 7 m/sec.
Subsequently, using a metal halide lamp and an apparatus provided at a rear portion with respect to a uniaxial direction, curing was performed by light application when 70 milliseconds had passed after the ejection of the liquid B-1. The head feeding speed was set at 500 mm/sec and the ejection frequency was set at 2.9 kHz. The amount of light applied was set so as to be sufficient to cure the liquids A-1 and B-1.

A photograph taken with a laser microscope, and the result of a measurement of the distance between the peak of a convex portion and the bottom of a concave portion (the amplitude) are shown in FIG. 2A. The curve in the drawing represents the amplitude; it was found that an exquisite approximate sine curve was present in a manner which conformed to a resolution pattern, and that a regular cell pattern in the form of quadrilaterals when seen from above was formed. Portions to which the liquid B-1 had been ejected to form dots had concave shapes, whereas portions to which the liquid B-1 had not been ejected had convex shapes; an approximate sine curve covered the entire surface, forming an exquisite cell pattern. A film with this cell pattern obtained in this manner corresponds to a film which has the smooth pattern according to (1) having a periodic amplitude based upon a trigonometric function, with respect to a direction perpendicular to the liquid surface.

Note that if there is, in a pattern, a portion where a colorant (e.g., pigment) is dense, the portion generally appears in an image; however, such a cell pattern as in the present invention does not have a portion where a colorant is dense, and the colorant spreads uniformly, as shown in FIG. 2A. The uniform spreading of the colorant with simple application of one droplet to a pixel is enabled for the first time by applying the liquid B over the liquid A; application of droplets over a solid substrate does not enable the foregoing. Also note that the foregoing is not enabled unless attention is paid to the static surface tension of the liquid A and the smoothness of the substrate.

In the case where the thickness of the layer formed of the liquid A-1 was 15 µm, the amplitude was 7.3 µm, which was sufficiently large.

The distance between peaks was 170 µm that was equivalent to a resolution of 150 dpi, and so this approximate sine curve covered the entire surface in a manner that was faithful to the resolution. It was confirmed in an cross-sectional observation that the carbon black as a pigment contained in the liquid B-1 thinly spread over the entire surface. Strictly speaking, the amount of the pigment was slightly larger in the vicinities of the portions to which the liquid B-1 had been ejected to form dots; nevertheless, the pigment thinly spread over the entire surface of the liquid A-1. Regarding the pattern having a periodic amplitude according to (1), a colorant (e.g., a pigment) contained in the liquid B may be slightly biased toward the center of each pixel (although it spreads fairly uniformly) presumably because of the amplitude; whereas, regarding the pattern in the form of a periodic flat surface according to (3), presumably a colorant (e.g., a pigment) spreads completely uniformly.

These results demonstrate that a highly accurate cell pattern having a height based upon an approximate sine curve was obtained over the entire surface except for an edge surface where dots are not continuous.

When the thickness of the layer formed of the liquid A-1 was increased to approximately 19 µm, the amplitude decreased to 5.3 µm.

When the thickness of the layer formed of the liquid A-1 was further increased to approximately 26 μm, the amplitude further decreased to 3.7 μm.

The above results demonstrate that, in the case where the liquid B-1 was ejected at 150 dpi×150 dpi, the liquid B-1 thinly spread over the entire surface of the layer formed of the liquid A-1, and a periodic cell pattern based upon an approximate sine curve could be formed in a direction perpendicular to the liquid surface and in a manner that conformed to the predetermined distance between dots. The amplitude of the cell pattern became greater as the layer formed of the liquid A-1 became thinner, and an amplitude of approximately 10 μm was attained.

It is not clear why the amplitude becomes greater as the layer formed of the liquid A-1 becomes thinner; it is presumed that this is because the amplitude attenuates more slowly as the layer formed of the liquid A becomes thinner.

When the length of time spent after the ejection of the liquid B-1 and until the application of light was lengthened to 350 milliseconds, the amplitude became less than 1 μm. In this case, the head feeding speed was 100 m/sec and the ejection frequency was 0.59 kHz. It was found that when the amplitude decreased to 0.1 μm or less, there was virtually no concavo-convex shape. This was confirmed in an cross-sectional observation as well.

These results demonstrate that, in the case where an amplitude with respect to a direction perpendicular to the liquid surface is not needed but a state where a colorant uniformly spreads in the form of cells is needed, it is reasonable to lengthen the length of time spent after the ejection of the liquid B and until the application of light. A film obtained in this manner corresponds to a film having the pattern in the form of a periodic flat surface according to (3).

It was, however, found that when the liquid A had a low viscosity (50 mPas or less) and a high static surface tension (40 mN/m or greater), a cell pattern in the form of a periodic flat surface was formed within 100 milliseconds after the ejection of the liquid B, as described later.

Thus, it has been found that a cell pattern whose surface shape is a highly regular, smooth approximate sine curve when seen in cross section, and which is in the form of organized quadrilateral cells when seen from above, as shown in FIG. 2A, can be formed with ease. Fixed semipermanently by the curing with light, this pattern is effective, for example as a plate for decoration or as a base material to store a functional material in.

As just described, the method of the present invention is very suitable for spreading a functional material such as a colorant relatively uniformly. Additionally, in the case where a pattern having a periodic amplitude needs to be obtained, it is reasonable to shorten the length of time spent after the ejection of the liquid B and until the application of light; in the case where a smooth pattern needs to be obtained, it is reasonable to lengthen the length of time spent after the ejection of the liquid B and until the application of light.

In Example 1, it was confirmed that the pigment contained in the liquid B-1 thinly spread over the surface of the layer formed of the liquid A-1. Hence, it has been found that, in the case where a solid image is required, it is possible to obtain an image with a uniform image density and without white spots (non-printed parts). In the case of single droplets, dots alongside which there are no dots spread circularly; it was found that the spreading of each dot could be kept within 200 μm in diameter (when the resolutions of the liquid B were 150 dpi×150 dpi), provided that light was applied immediately (within 19 milliseconds) after the ejection of the liquid B.

Also, it was found that the foregoing spreading could be adjusted by slightly lowering the static surface tension of the liquid A.

Comparative Example 1

The liquid B-1 was ejected in the same manner as in Example 1 except that a liquid A-2 (liquid prepared by adding a surfactant to the liquid A-1) was used instead of the liquid A-1.

Figure 2B:
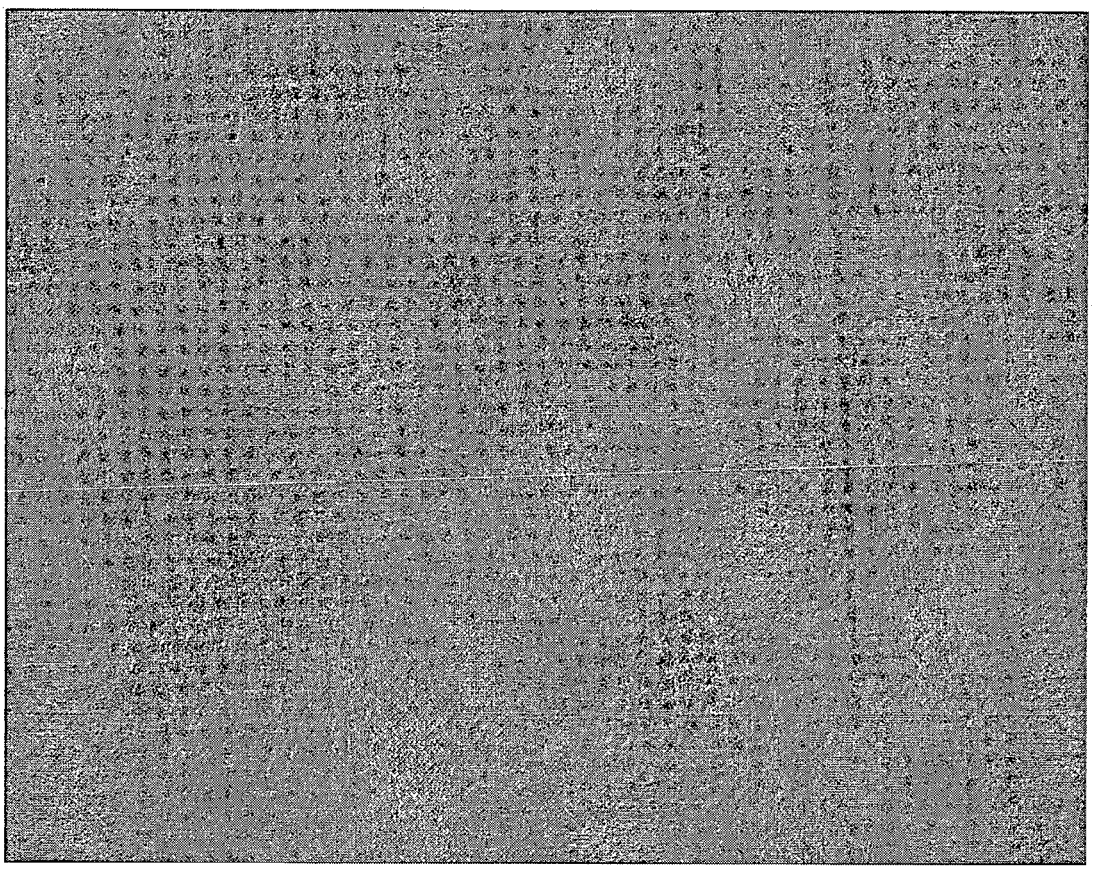
FIG. 2B is a photograph (taken with a laser microscope) showing a state of a film produced in Comparative Example 1, where a liquid B has partially sunk and is in the form of a dot.

As a result, a cell pattern as obtained in Example 1 was not obtained, and the liquid B partially sank (see FIG. 2B). As shown in the drawing, the shape of the obtained pattern when seen from above was such that the liquid B did not spread but remained in the form of dots (a dot pattern was formed). In relation to the term "sank" used above, the term "sink" means that a portion to which the liquid B has been ejected is small (1 μm or less in size) in comparison with other cases, and so the upper part of the liquid B is not necessarily covered with the liquid A. If the length of time spent after the ejection of the liquid B and until the application of light is long, the liquid B may possibly sink into the liquid A. In any case, the pattern obtained in Comparative Example 1 was not in a state where the liquid B spread over the entire surface of the liquid A and a pattern in the form of cells when seen from above was obtained, as yielded by Example 1.

Slight depressions of 1 μm or less in depth were formed at portions to which the liquid B-1 had been ejected to form dots; however, the pigment contained in the liquid B-1 did not spread over the entire surface and a pattern having a periodic amplitude based upon an approximate sine curve did not appear. The area of spreading of the liquid B-1 at dots was small and the depth thereof was slight. No portions other than the portions to which the liquid B-1 had been ejected to form dots were affected, and a pattern having an exquisite, periodic concavo-convex shape based upon an approximate sine curve was not obtained. In fact, a result of an cross-sectional observation demonstrated that the pigment contained in the liquid B-1 had sunk into a layer formed of the liquid A-2. In this case, the viscosity of the liquid A-1 used in Example 1 and the viscosity of the liquid A-2 used in Comparative Example 1 did not differ much, and the static surface tension of the liquid A-2 was smaller owing to the addition of the surfactant.

The above results demonstrated that a change in the static surface tension of the liquid A brought about by the addition of a small amount of a surfactant could give rise to a significant phenomenal change even though there was little difference in viscosity and density.

As just described, when the static surface tension of the liquid A is small, none of the patterns according to (1) to (4) can be formed. To obtain any of the patterns according to (1) to (4), the physical properties of the liquid A matter, and the static surface tension of the liquid A is preferably 35 mN/m or greater (at 25° C.). Note that even when the static surface tension of the liquid A is 30 mN/m or greater, but less than 35 mN/m, a cell pattern can be formed in some cases, although it is imperfect or unstable.

It should be noted that the foregoing cases are where the static surface tension of the liquid B is 25 mN/m or less, and that when the static surface tension of the liquid B is higher, similar results cannot be yielded unless the static surface tension of the liquid A is suitably made somewhat higher (40 mN/m or greater).

Comparative Example 2

The liquid B-1 was ejected in the same manner as in Example 1 except that a liquid A-3 was used instead of the liquid A-1.

In Comparative Example 2, neither the patterns according to (1) and (3) where the liquid B spreads over the entire surface as in Example 1 nor the pattern where droplets of the liquid B do not spread much but sink as in Comparative Example 1 was obtained, and the obtained pattern was somewhere between those obtained in Example 1 and Comparative Example 1. This means that when the static surface tension of the liquid A is 30 mN/m or greater, but less than 35 mN/m, none of the patterns according to (1) to (3), where the liquid B spreads over the entire surface, are obtained and the liquid B spreads in an imperfect manner, which is not favorable.

Meanwhile, when a liquid A-4 (liquid prepared by adding a surfactant to the liquid A-3) was used instead of the liquid A-3, a dot pattern where the liquid B did not spread at all was obtained, which is different from the case where the liquid A-3 was used.

Example 2

Liquid ejection was carried out in the same manner as in Example 1 except that a liquid B-3 was used instead of the liquid B-1.

Figure 2C:
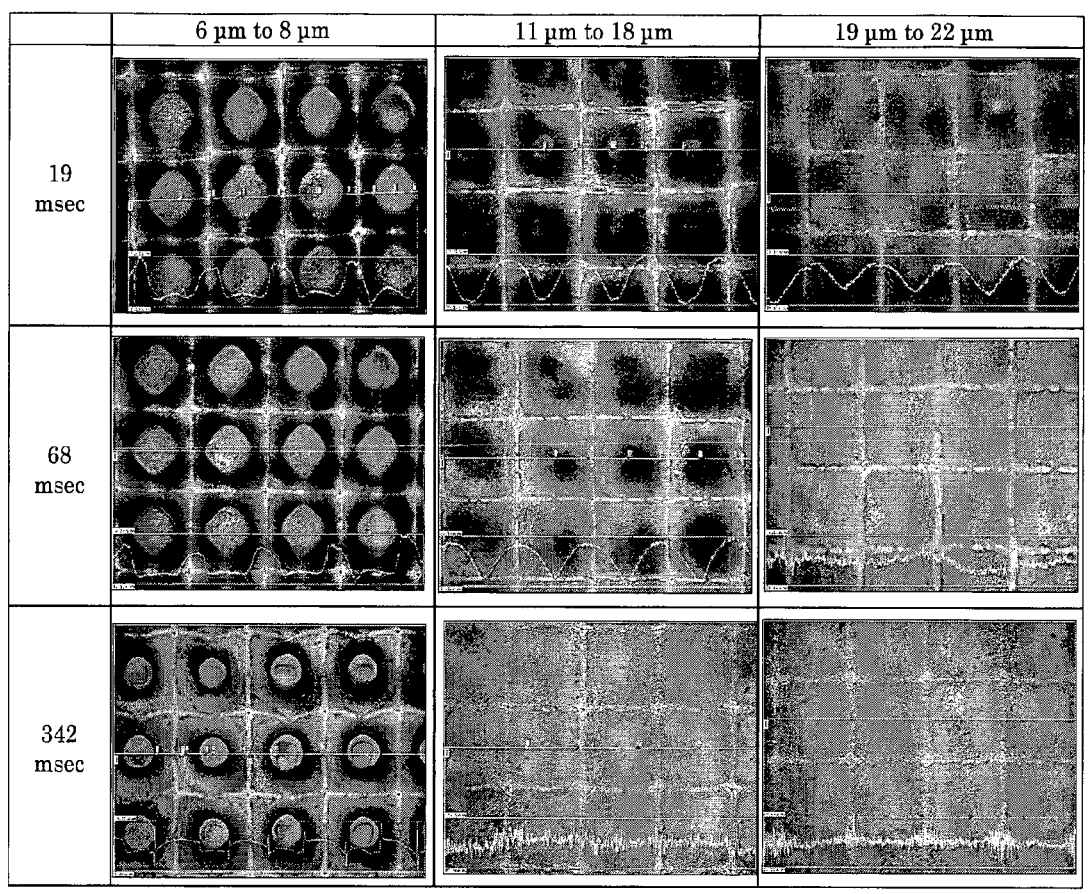
FIG. 2C is a photograph (taken with a laser microscope) of films produced in Example 2.

As a result, a film having a cell pattern was obtained. Results obtained when the thickness of a layer formed of the liquid A-1 was changed and the length of time spent after the ejection of the liquid B and until the application of light for curing was changed are shown in FIG. 2C (photograph taken with a laser microscope). The horizontal axis denotes the thickness and the vertical axis denotes the time.

FIG. 2C shows that the pattern according to (1) can be obtained when curing takes place within 68 milliseconds after the ejection of the liquid B, and that the pattern according to (3) can be obtained when curing takes place 342 milliseconds after the ejection of the liquid B. This demonstrates that, to increase a periodic amplitude based upon a trigonometric function, the layer thickness of the liquid B and the timing for curing should be made appropriate, although the increase depends upon the layer thickness of the liquid A-1 as well.

Figure 3A:
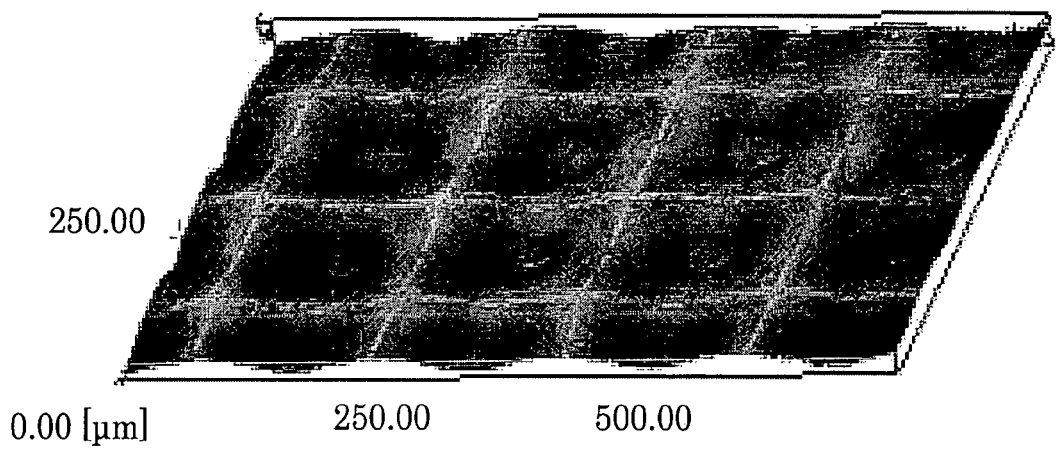
FIG. 3A is a three-dimensional image of a photograph (taken with a laser microscope) of a film which has a smooth pattern having a periodic amplitude based upon a trigonometric function.
Figure 3B:
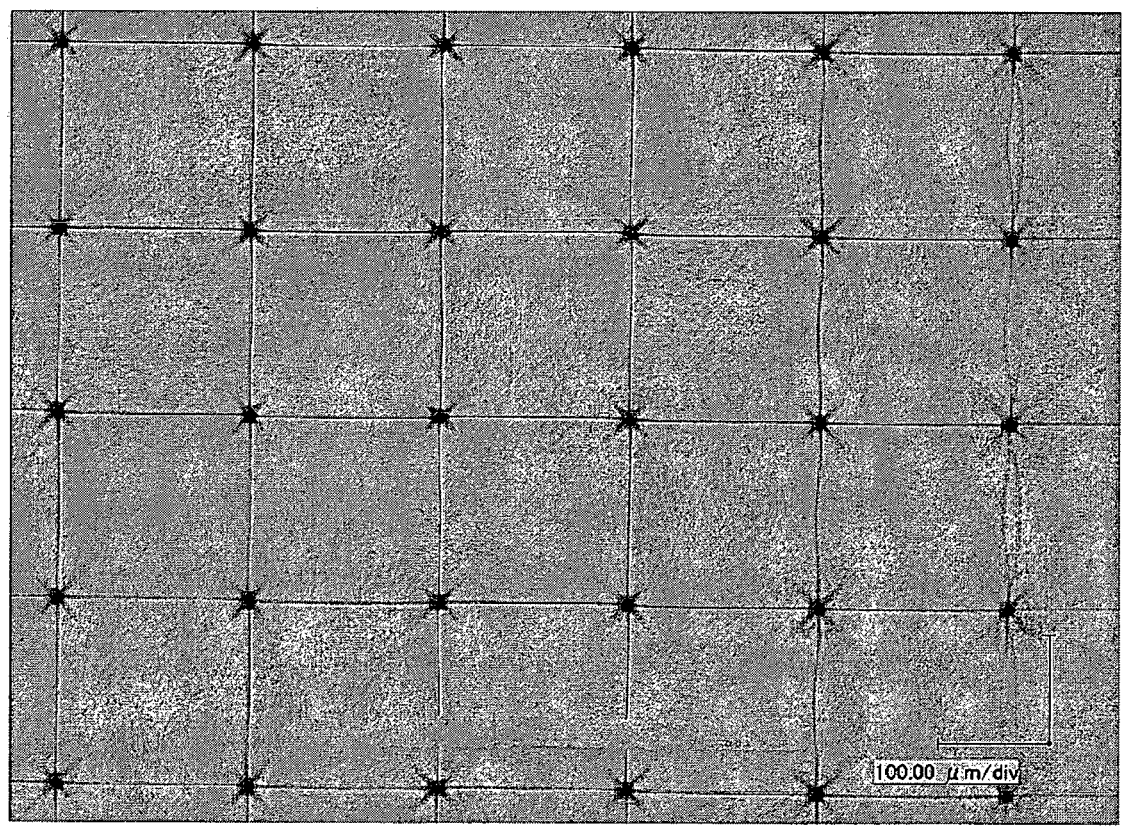
FIG. 3B is a photograph (taken with a laser microscope) of a film having a periodic depression, produced in Example 3.
Figure 3C:
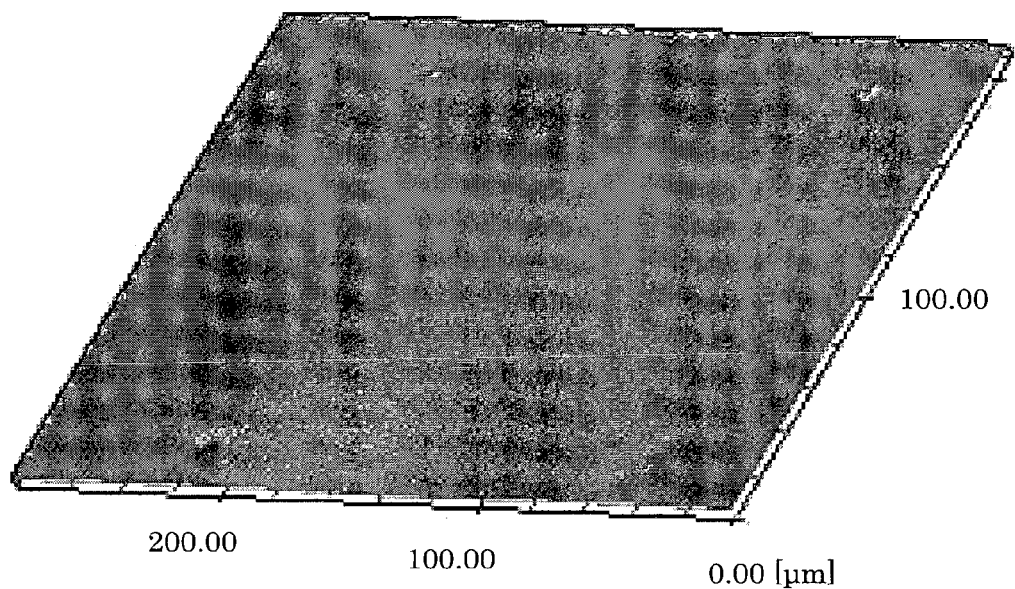
FIG. 3C is a three-dimensional image of FIG. 3B.
Figure 3D:
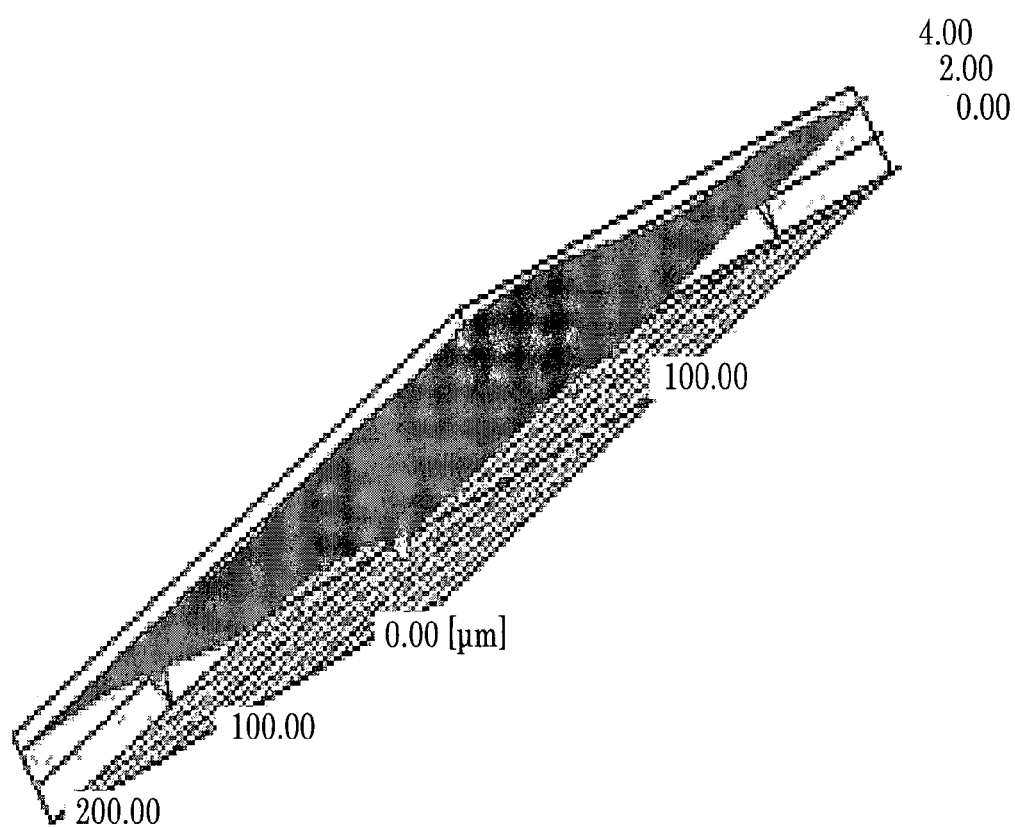
FIG. 3D is an image in which the longitudinal length of FIG. 3C is enlarged fivefold.
Figure 3E:
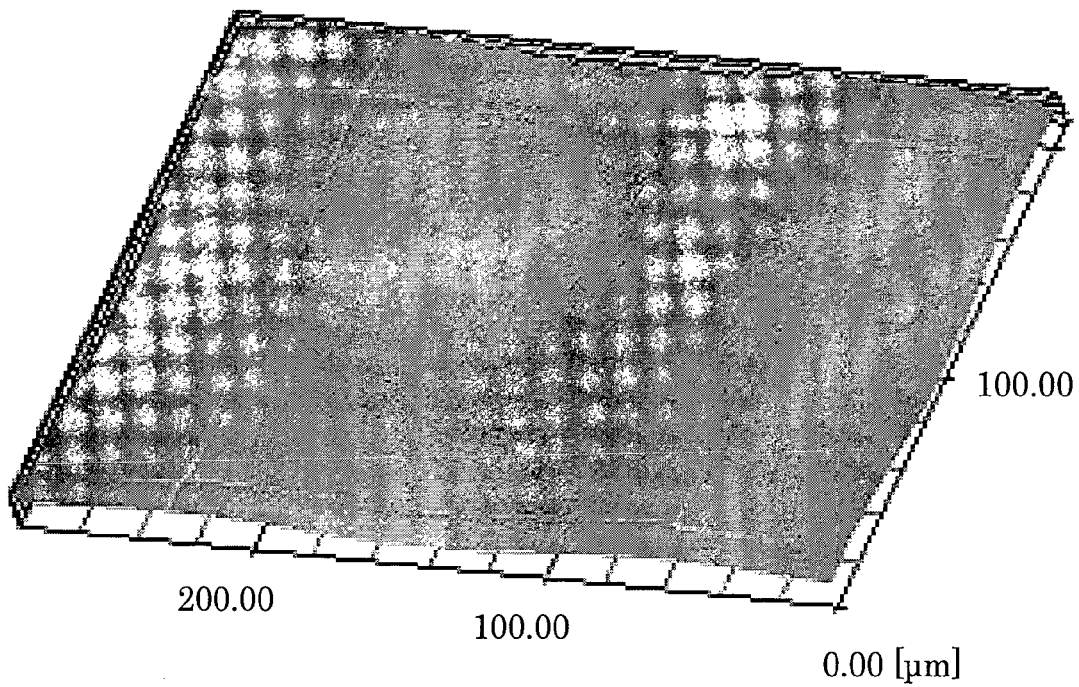
FIG. 3E is a three-dimensional image of a photograph taken with a laser microscope when 70 milliseconds have passed after ejection of a liquid B-3 in Example 3.
Figure 3F:
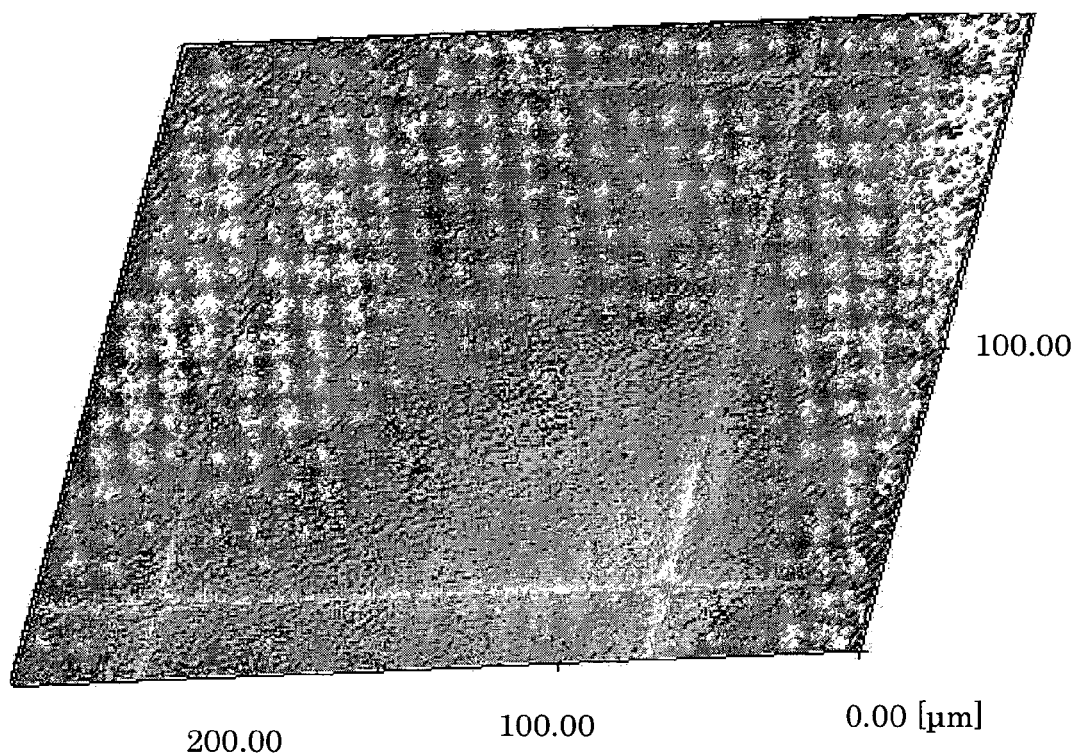
FIG. 3F is a three-dimensional image of a photograph taken with a laser microscope when a certain amount of time has passed in Example 3.
Figure 3G:
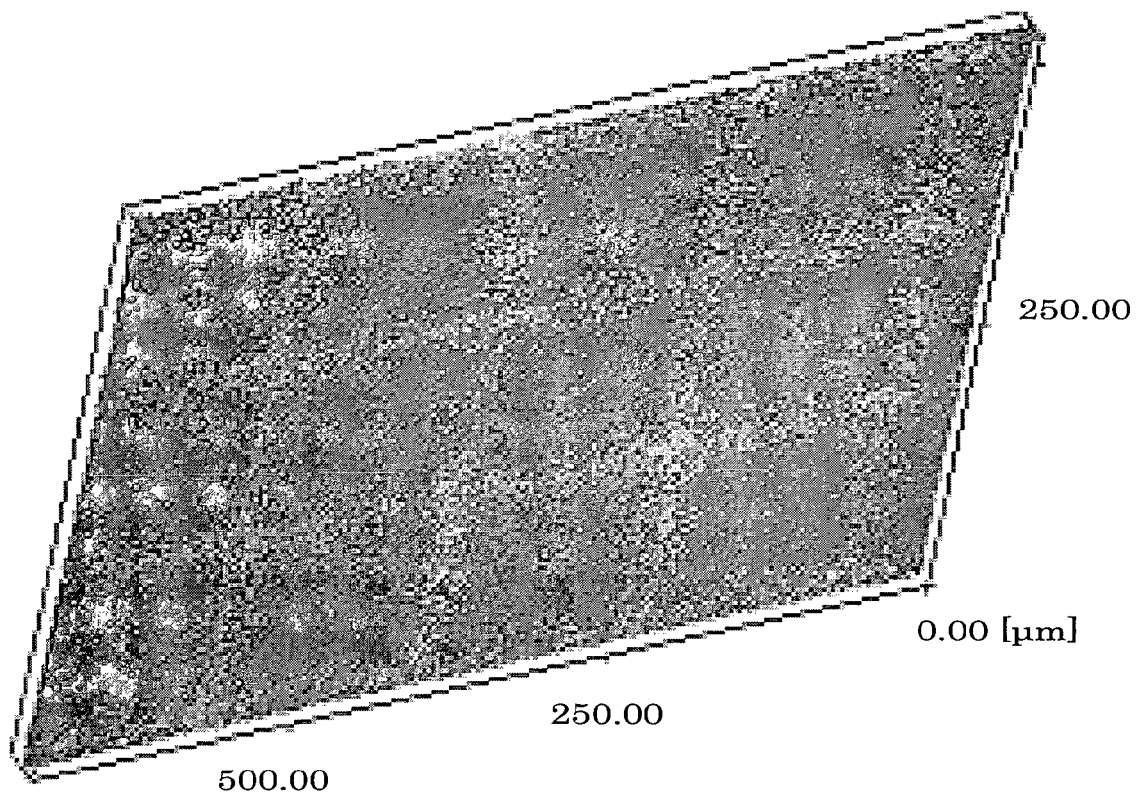
FIG. 3G is a three-dimensional image of a photograph (taken with a laser microscope) of a film having a pattern in the form of a periodic flat surface according to (3).

Three-dimensional images of photographs taken with a laser microscope are shown in FIGS. 3A and 3G.

FIG. 3A shows an example of the pattern according to (1) and is related to the case where the thickness of a layer formed of the liquid A is 11 µm, and curing with light is performed when 19 milliseconds have passed after the ejection of the liquid B.

FIG. 3G shows an example of the pattern according to (3) and is related to the case where curing is performed when 342 milliseconds have passed after the ejection of the liquid B. It is understandable that a pigment as a functional material uniformly and thinly spreads. This pattern is advantageous when smoothness is required. There is almost no longitudinal amplitude remaining. As just described, a functional material can be thinly applied with ease by an inkjet-ultraviolet process.

In the present Example as well, a film having a cell pattern was not obtained when the surfactant-containing liquid A-2 was used instead of the liquid A-1.

Example 3

Liquid ejection was carried out in the same manner as in Example 1 except that a liquid A-5 was used instead of the liquid A-1 and the liquid B-3 was used instead of the liquid B-1.

The present Example is characterized by the high viscosity of the liquid A-5. A photograph of a film taken with a laser microscope, in the case where the layer thickness of the liquid A-1 was approximately 10 µm and curing was performed when 350 milliseconds had passed after the ejection of the liquid B-3, is shown in FIG. 3B; here, a film having a regular cell pattern without disturbance was obtained which appeared as if it was made by drawing lines with a ruler.

A three-dimensional image (there is no difference in ratio among x, y and z) of the foregoing photograph reveals that a periodic depression (approximately 20 µm to approximately 30 µm in height) without disturbance was formed as shown in FIGS. 3C and 3D. FIG. 3D is an image in which the longitudinal length of FIG. 3C is enlarged fivefold. Note that what appear to be protrusions are seen in the depressions in some cases.

Four corners are swollen when 70 milliseconds have passed after the ejection of the liquid B-3, as shown in FIG. 3E (three-dimensional image of a photograph taken with a laser microscope); however, depressions are formed when 350 milliseconds have passed after the ejection, as shown in FIGS. 3C and 3D.

When time has passed further, cells that are flat surfaces with no depressions whatsoever and that are accurately in the shape of squares are formed as shown in FIG. 3F (three-dimensional image of a photograph taken with a laser microscope). The color of the pigment uniformly spread in a perfect manner. White narrow boundaries were thought to be where there was no pigment. If the colorant (pigment) is conductive, it is possible to produce, for example, electrodes with the distance between the electrodes being very short. Such a distance is deemed ideal as the distance between a source electrode and a drain electrode in an organic transistor.

Comparative Example 3

The liquid B-3 was ejected in the same manner as in Example 3 except that a liquid A-6 (liquid prepared by adding a surfactant to the liquid A-5) was used instead of the liquid A-5.

Figure 3H:
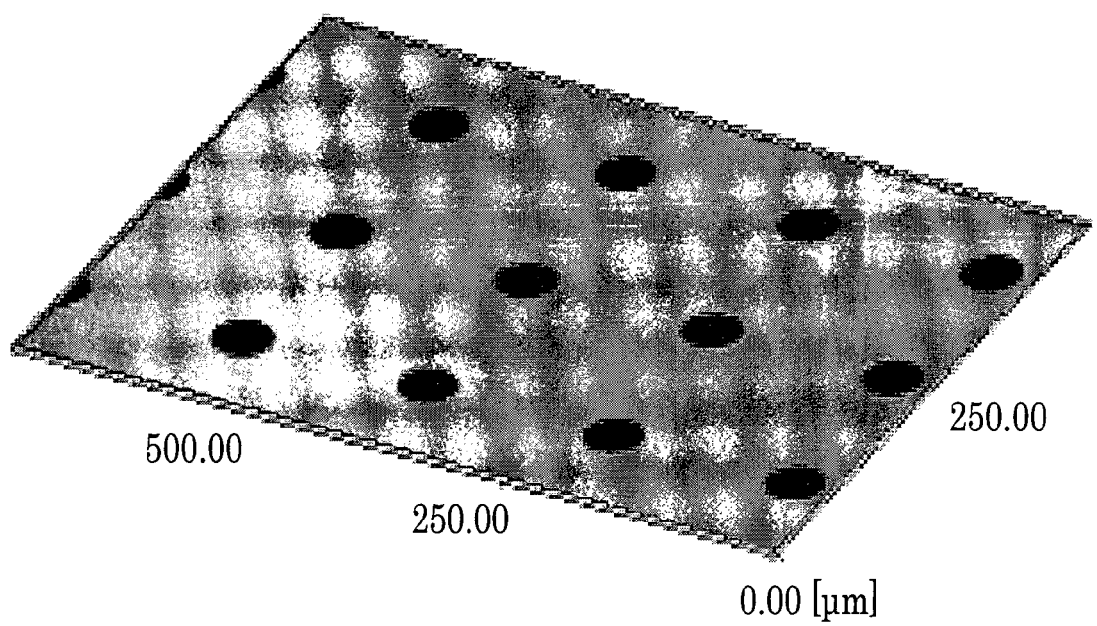
FIG. 3H is a three-dimensional image of a photograph (taken with a laser microscope) of a film having a dot pattern where a pigment does not sufficiently spread, according to Comparative Example 3.

As a result, a cell pattern as in Example 3 was not obtained, and a film having a dot pattern where the pigment did not spread was obtained as shown in FIG. 3H (three-dimensional image of a photograph taken with a laser microscope).

With the combination employed in the present Comparative Example, it was impossible to obtain a film having any of the patterns according to (1) to (4) even if the timing of curing after the ejection of the liquid B-3, and the layer thickness of the liquid A-6 were changed.

Example 4

Liquid ejection was carried out in the same manner as in Example 1 except that a liquid A-7 was used instead of the liquid A-1 and the liquid B-3 was used instead of the liquid B-1.

Figure 3I:
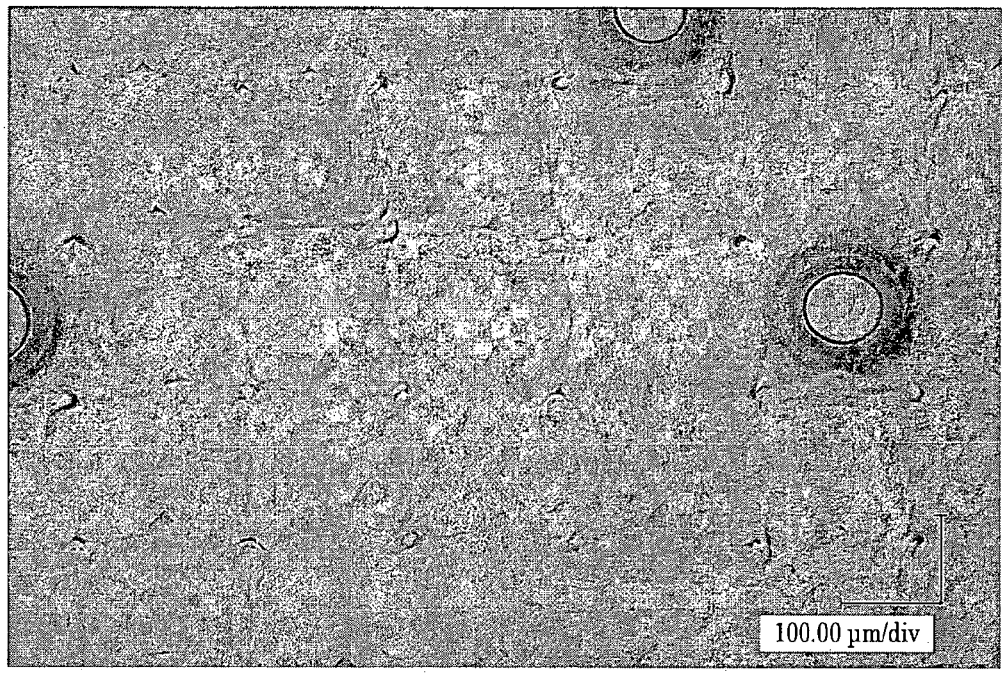
FIG. 3I is a photograph (taken with a laser microscope) of a film having many portions where a pattern is disturbed, according to Example 4.

In the present Example, since the static surface tension of the liquid A-7 was 37 mN/m or greater, a cell pattern was observed; however, there were many portions where the pattern was disturbed as shown in FIG. 3I (photograph taken with a laser microscope). This disturbance intensified as the length of time, spent after the ejection of the liquid B and until curing by the application of light, lengthened and so the disturbance is thought to have been caused by the fact that the liquid A-7 had a low viscosity.

Additionally, as described later, it was found that this seemingly disturbed pattern was in fact formed because of the following: the layer thickness of the liquid A was small and the static surface tension of the liquid A was fairly high; thus, the ejection of the liquid B caused the liquid A to detach from the substrate (exhibit repellency). Parts of the liquid A that exhibited repellency spread as time passed.

Note that even if the liquid A has a low viscosity and a high static surface tension as in the present Example, a film having the pattern according to (1) or (3) can be produced, provided that curing with light is performed immediately after the ejection of the liquid B. Also, when the layer thickness of the liquid A is great, such repellency does not occur.

Comparative Example 4

The liquid B-3 was ejected in the same manner as in Example 4 except that a liquid A-8 (liquid prepared by adding a surfactant to the liquid A-7) was used instead of the liquid A-7.

As a result, a cell pattern as in Example 4 was not obtained, and what was obtained was a film having a pattern where dots did not spread regardless of the layer thickness of the liquid A-8 or the timing of the application of light.

Example 5-1

Case where the Liquid a Had a Low Viscosity and a High Static Surface Tension, and a Cell Pattern in the Form of a Periodic Flat Surface was Formed within a Short Period of Time after the Ejection of the Liquid B A liquid A-9 shown in Tables 3-1 and 3-2 below and a liquid B-6 shown in Tables 4-1 and 4-2 were used, the liquid A-9 was applied over a glass slide as in Example 1, and the liquid B-6 was ejected over the liquid surface of the liquid A-9.

Figure 5A:
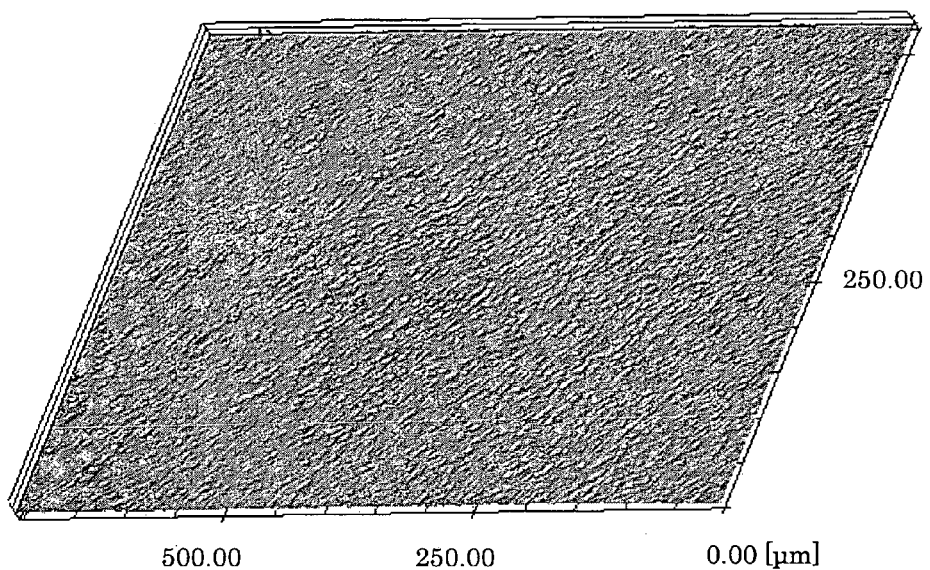
FIG. 5A is a drawing showing a case where a liquid A having a low viscosity and a high static surface tension is used and a pattern in the form of a periodic flat surface is formed in a short period of time after ejection of a liquid B, according to Example 5-1.

The liquid A was made to have layer thicknesses of 10 μm and 15 μm, and curing was performed by the application of light when 28 milliseconds had passed after the ejection of the liquid B; as a result, a cell pattern in the form of a periodic flat surface was obtained as shown in FIG. 5A (three-dimensional image of a photograph taken with a laser microscope).

A result of an observation with a microscope revealed that the pigment spread over the entire surfaces of cells relatively uniformly. A narrow line lying between each dot was thought to be where the liquid A remained. In the cases of resolutions of 150 dpi×150 dpi and resolutions of 150 dpi×75 dpi as well, cell patterns in the form of periodic flat surfaces were obtained. As just described, in the case where the liquid A has a low viscosity (50 mPas or less) and a high static surface tension (40 mN/m or greater), a cell pattern in the form of a periodic flat surface can be obtained when a relatively short period of time has passed after the ejection of the liquid B. The foregoing pattern could be obtained even when the application of light was performed 40 seconds after the ejection of the liquid B, and so the foregoing pattern is relatively stable.

TABLE 3-1

| | Polymerizable compound | Initiator |
|---|---|---|
| A-9 | ACMO: 100 parts | IC379: 5 parts |
| A-10 | V#1000: 100 parts | IC379: 3 parts |

Details of the signs in the table above are as follows.

ACMO: acryloylmorpholine

V#1000: dendritic acrylate (Product name: VISCOAT #1000, manufactured by OSAKA ORGANIC CHEMICAL INDUSTRY LTD.)

IC379: photoinitiator (IRGACURE 379, manufactured by Ciba Specialty Chemicals plc)

TABLE 3-2

| | Static surface tension (mN/m) (25° C.) | Viscosity (mPas) (25° C.) |
|---|---|---|
| A-9 | 43 | 13 |
| A-10 | 38 | 520 |

TABLE 4-1

| | Polymerizable compound | Pigment | Initiator | Others |
|---|---|---|---|---|
| B-5 | PO-A: 23.6 parts<br>ACMO: 24.5 parts<br>TMPEOTA: 29 parts | SPECIAL BLACK 350: 7 parts | IC379: 14 parts | SOLSPERSE 32000: 1.4 parts<br>SOLSPERSE 5000: 0.4 parts<br>4-MNT: 0.01 parts |
| B-6 | PO-A: 23.6 parts<br>ACMO: 24.5 parts<br>TMPEOTA: 29 parts | SPECIAL BLACK 350: 7 parts | IC379: 14 parts | SOLSPERSE 32000: 1.4 parts<br>SOLSPERSE 5000: 0.4 parts<br>4-MNT: 0.01 parts<br>BYK-UV-3510: 0.02 parts |
| B-7 | PO-A: 23.6 parts<br>ACMO: 24.5 parts<br>TMPEOTA: 29 parts | SPECIAL BLACK 350: 7 parts | IC379: 14 parts | SOLSPERSE 32000: 1.4 parts<br>SOLSPERSE 5000: 0.4 parts<br>4-MNT: 0.01 parts<br>BYK-UV-3510: 0.15 parts |

Details of the signs in the table above are as follows.

PO-A: phenoxyethyl acrylate

TMPEOTA: trimethylolpropane ethoxy triacrylate

ACMO: acryloylmorpholine

4-MNT: 4-methoxy-1-naphthol

IC379: IRGACURE 379

TABLE 4-2

| | Static surface tension (mN/m) (25° C.) | Viscosity (mPas) (25° C.) |
|---|---|---|
| B-5 | 39 | 58 |
| B-6 | 24 | 58 |
| B-7 | 22 | 58 |

Example 5-2

Case where the Liquid a Had a Low Viscosity and a High Static Surface Tension, the Layer Thickness of the Liquid a was 5 µm or Less, and a Pattern Having a Periodic Semicylindrical Shape was Formed)

The liquid B was ejected at 150 dpi×75 dpi in the same manner as in Example 5-1, except that the layer thickness of the liquid A was adjusted to 2 µm. As a result, a circular pattern spread as time passed after the ejection of the liquid B, and what was obtained by curing with light performed when 300 milliseconds or more had passed after the ejection of the liquid B was a pattern having a periodic semicylindrical shape as shown in FIGS. 5B-1 to 5B-5 (three-dimensional images of photographs taken with a laser microscope).

Figures 1, 5B:
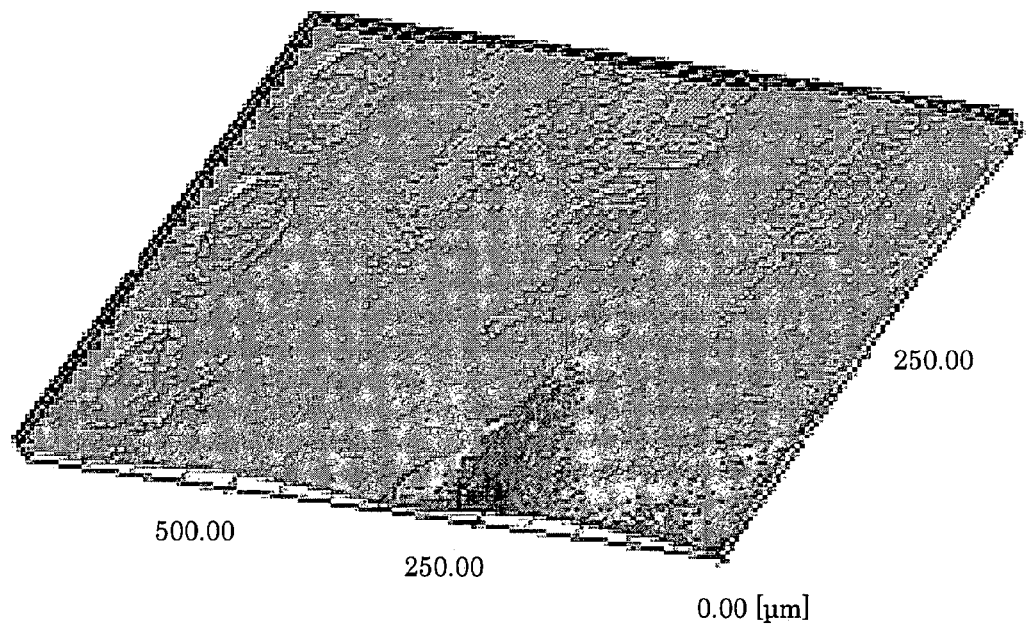
FIGS. 5B-1 to 5B-5 are drawings showing a case where a liquid A having a low viscosity and a high static surface tension is used and a periodic semicylindrical shape is formed when the liquid A has a small layer thickness of 5 μm or less, according to Example 5-2.
Figures 2, 5B:
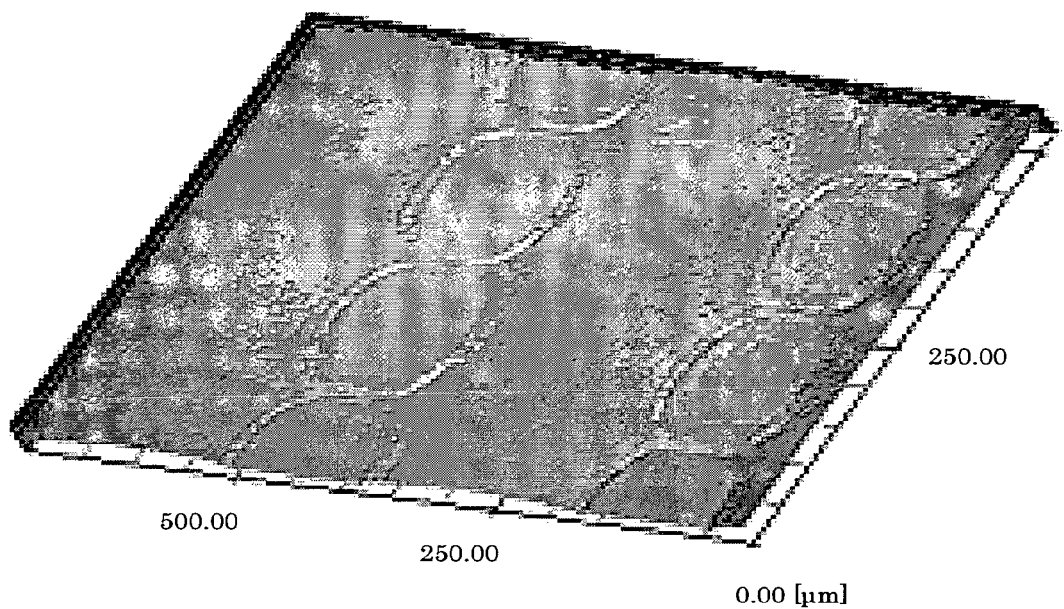
Figures 3, 5B:
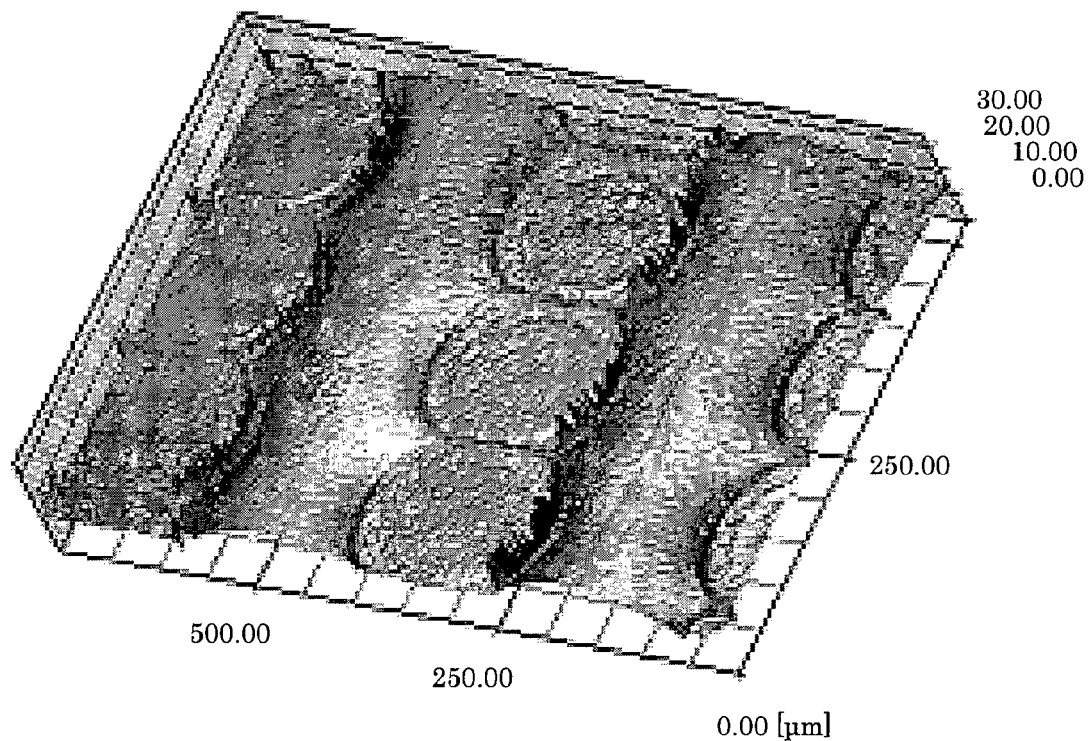
Figures 4, 5B:
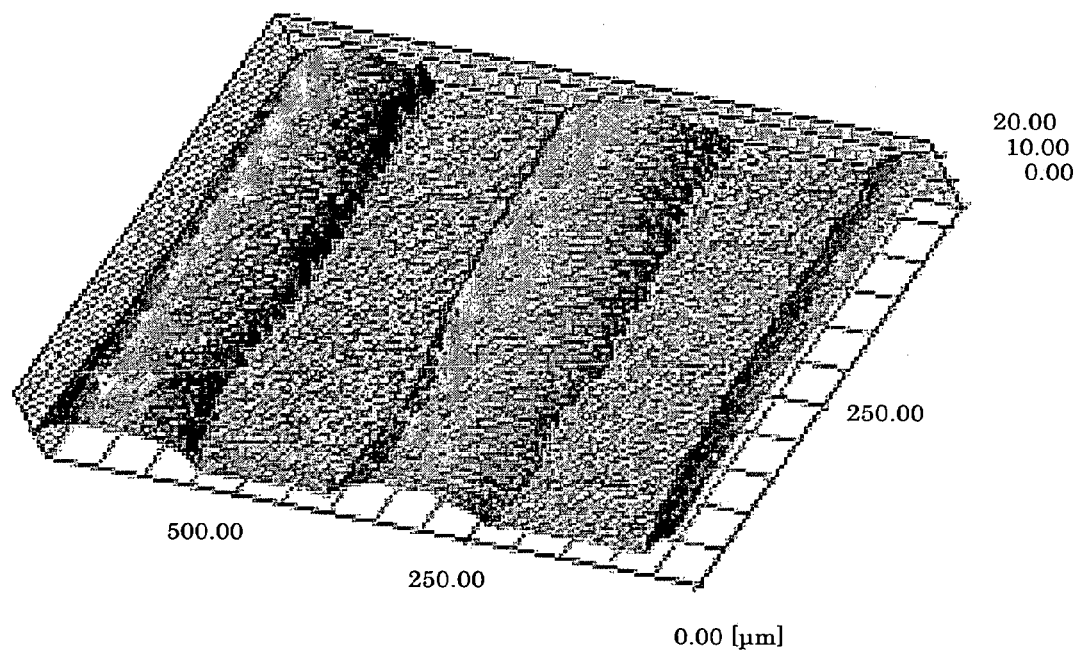
Figures 5, 5B:
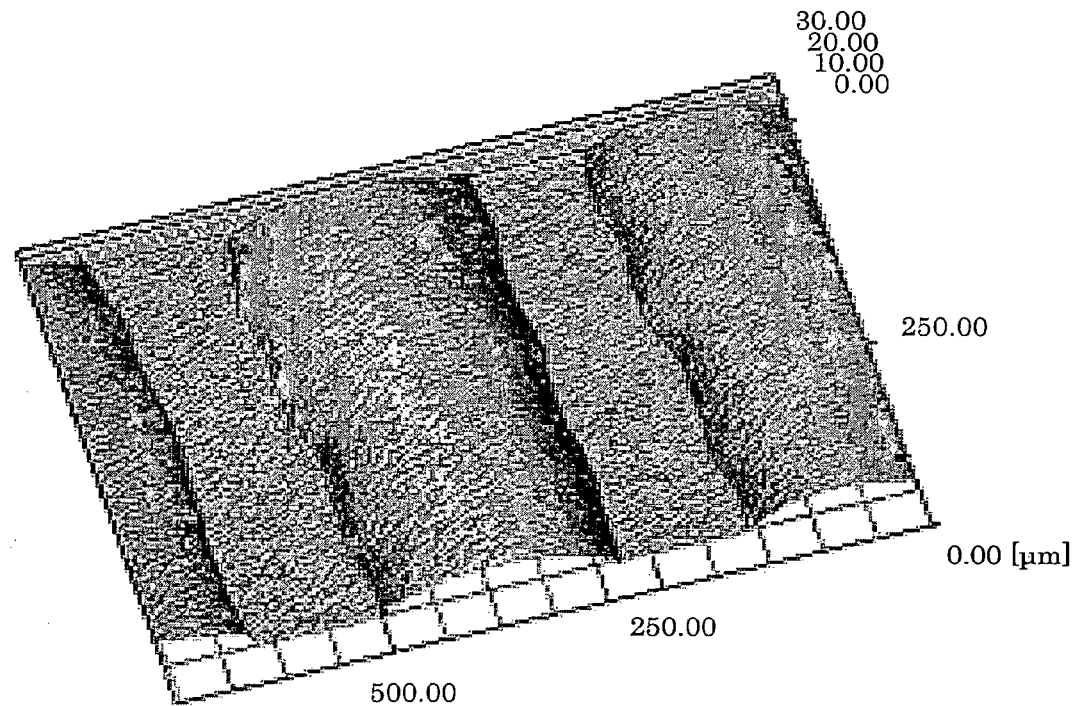

FIGS. 5B-1 to 5B-5 show a transition from a state of repellency to a state where a periodic semicylindrical shape is formed, with the passage of time; it is not that the same place is viewed. When 63 milliseconds had passed after the ejection of the liquid B, there was still a state of repellency and formation of a periodic semicylindrical shape was not complete.

The periodic semicylindrical shape has its major axis with respect to the direction in which the distance between dots is shorter. Therefore, the direction of the major axis of a periodic semicylindrical shape formed at 75 dpi×150 dpi and that of the major axis of a periodic semicylindrical shape formed at 150 dpi×75 dpi are different from each other by an angle of 90 degrees.

In Examples 5-1 and 5-2, it was confirmed with a laser microscope that the pigment contained in the liquid B spread substantially uniformly over the liquid surface of the liquid A; presumably the liquid B spread over the liquid surface of the liquid A in a very short period of time and a flat-surface (cell) pattern was thus formed. (However, as far as an observation with a laser microscope was concerned, the liquid B was deemed not continuous at a very narrow part between each cell.) Also, the following can be given as a supposition: the distance between the glass slide serving as the substrate and thin parts of the liquid A was short; therefore, the thin parts underwent a phenomenon of repellency, i.e., detached from the substrate, the parts with the repellency spread circularly, the liquid A having a great static surface tension was made to move toward corners of each cell and became round as time passed, droplets of the liquid A joined together where the distance between dots was short, and a periodic semicylindrical shape of the liquid A was thus formed. In this case as well, it is presumed that the liquid B spread thinly over the periodic semicylindrical shape and at the parts with the repellency. There is a possibility that the liquid B permeated between the periodic semicylindrical shape of the liquid A and the substrate (in other words, that the liquid B enveloped the liquid A), although the permeation has not actually been confirmed. As described above, by changing the distances between dots with respect to the X-axis direction and the Y-axis direction, lines in the form of a periodic semicylindrical shape can be produced with respect to a direction that conforms to the intended purpose, and thus a periodic semicylindrical shape that conforms to the intended purpose can be produced.

Places where lines in the form of a periodic semicylindrical shape are not needed can be secured, for example, by not ejecting the liquid B, or by equalizing the resolution between the X-axis direction and the Y-axis direction, or by increasing the static surface tension of the liquid B at the places and thus preventing the liquid B from spreading, or by injecting only the places with a liquid of a surfactant beforehand such that the liquid A only at the places has a low static surface tension.

It is surprising that the foregoing patterns can be produced with ease, simply by applying droplets over a liquid. Presumably, the patterns can be applied to a variety of uses.

Comparative Example 5-1

The liquid B-6 was ejected in the same manner as in Example 5-1 except that a surfactant (BYK-UV3510, manufactured by BYK Japan KK) was added to the liquid A-9 so as to make the liquid A-9 have a low static surface tension.

As a result, a cell pattern in the form of a periodic flat surface, where the liquid B spread, as in Example 5-1 was not obtained, and a pattern where dots of the liquid B had sunk into the liquid A was obtained. Note that when the amount of the surfactant added was, for example, 0.2% by mass relative to the monomer content, a complete dot pattern was formed.

Example 6

The liquid B-6 was ejected in the same manner as in Example 5-2 except that a liquid A-10 having a viscosity of 50 mPas or greater (see Tables 3-1 and 3-2) was used.

As a result, a periodic semicylindrical shape was not obtained even when the layer thickness of the liquid A was 2 µm. Accordingly, to prevent repellency and formation of a semicylindrical shape, the liquid A needs to have a great viscosity or a great layer thickness. It should, however, be noted that the result of the present Example may be due to the fact that the static surface tension of the liquid A was appropriate, being in the range of 35 mN/m to 40 mN/m, not exceeding 40 mN/m.

A confirmable significant difference between a pattern where dots do not spread but sink, with 0.2% by mass or more of a surfactant added, as in Comparative Examples and a pattern where the liquid B spreads over the liquid surface of the liquid A as in the present invention is as follows: in the case of the former pattern, when the layer thickness of the liquid A is great relative to the amount of dots of the liquid B, a pattern where the liquid B sinks into the liquid A is formed (liquid B-ejected portions are in low positions), whereas when the layer thickness of the liquid A is small relative to the amount of dots of the liquid B, a pattern where the liquid B lies over the liquid surface of the liquid A is formed (liquid B-ejected portions are in high positions); in the case of the latter pattern, even when the layer thickness of the liquid A is small, liquid B-ejected portions are in low positions immediately after the ejection of the liquid B, which allows the liquid A to become round and swollen.

Example 7

Figures 1, 8:
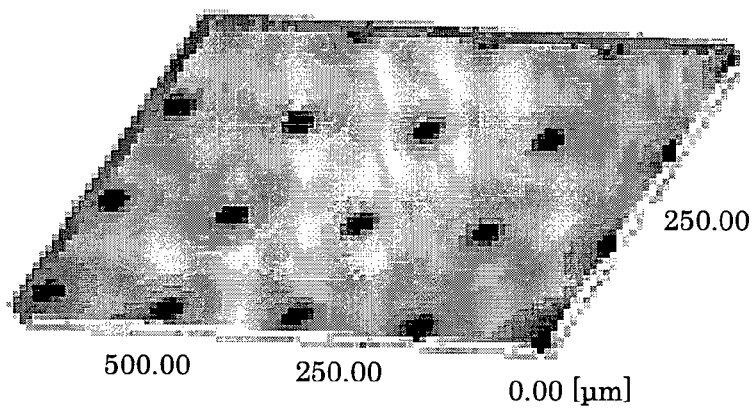
Figures 2, 8:
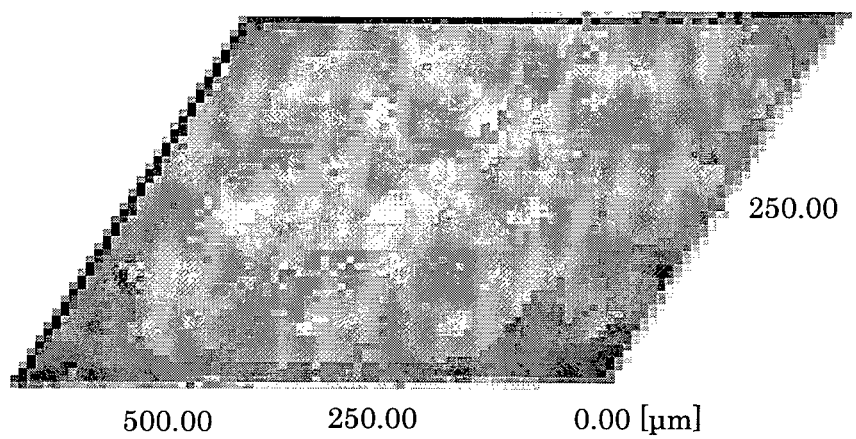
Figures 3, 8:
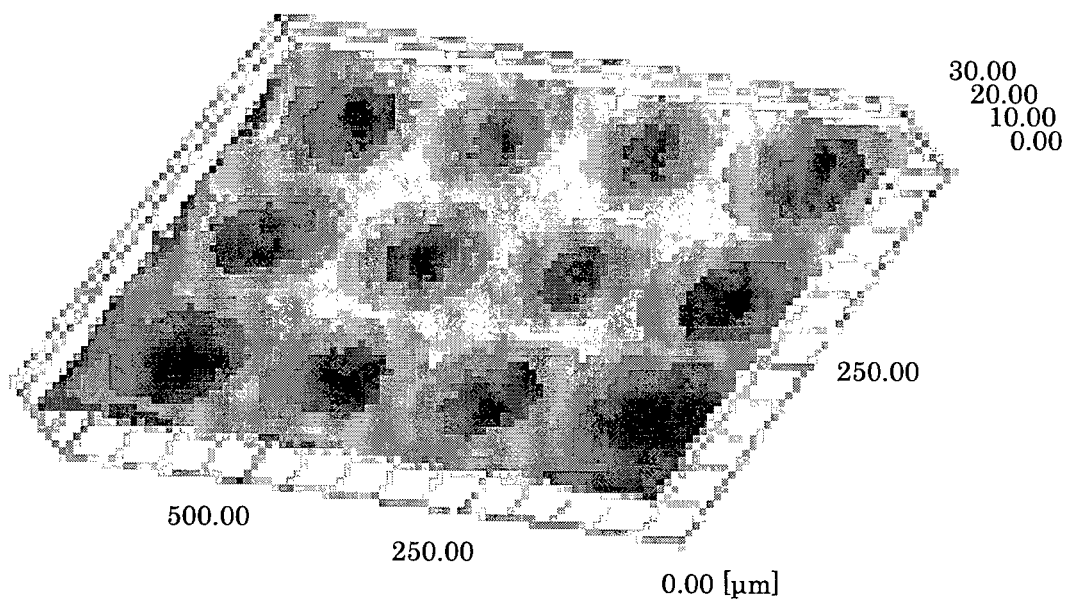
Figures 4, 8:
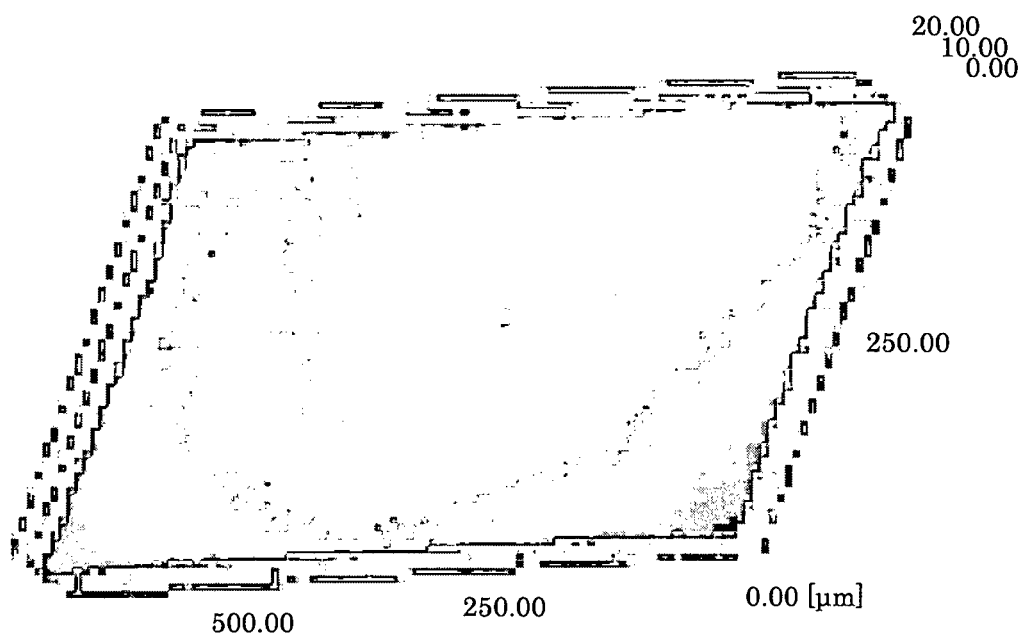
Figures 5, 8:
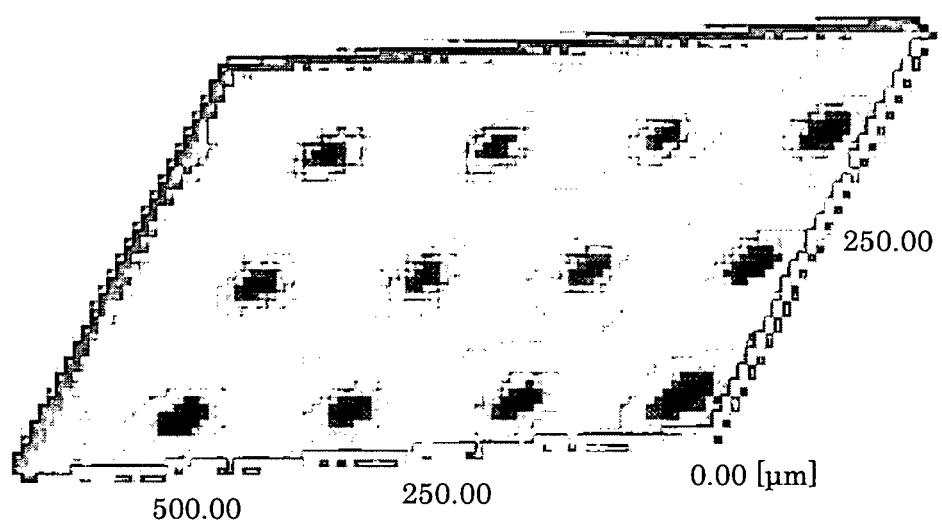
Figures 6, 8:
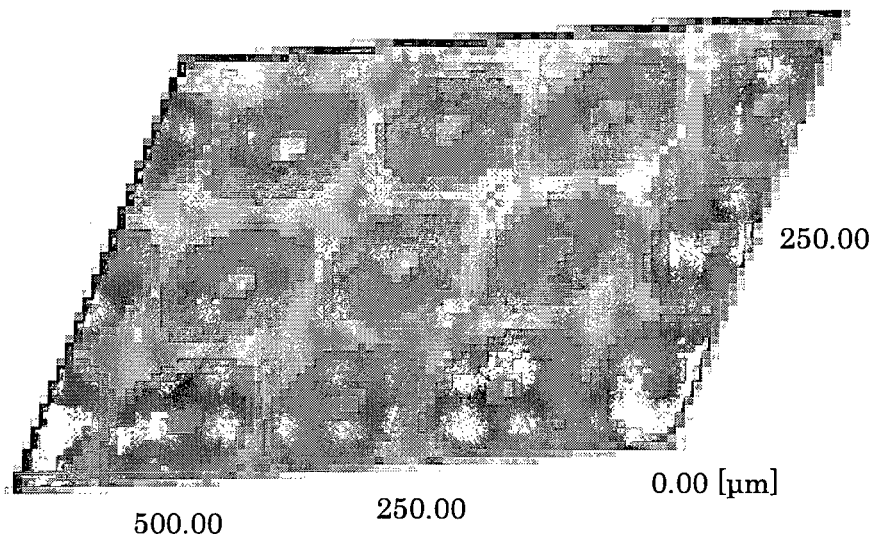
Figures 7, 8:
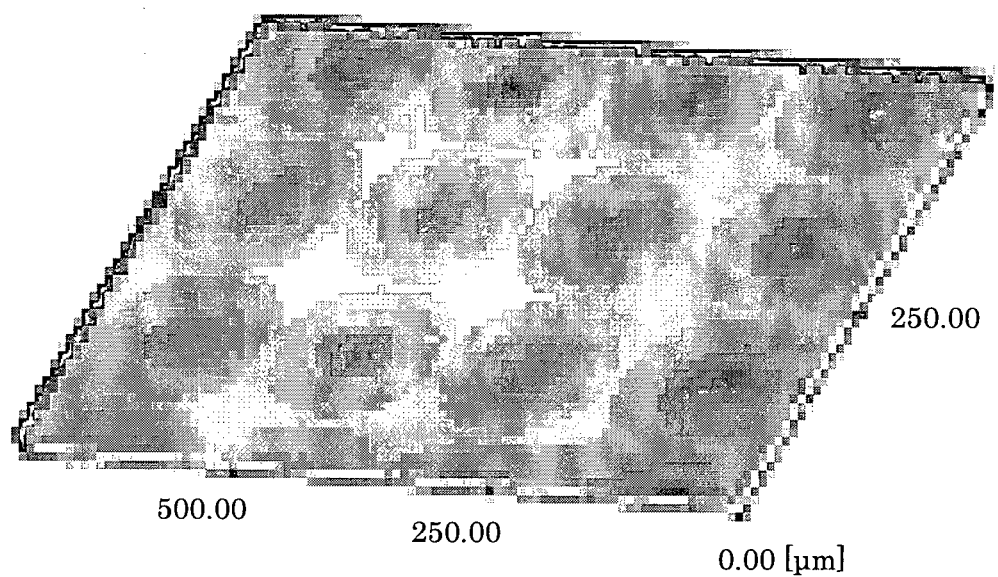
Figure 8:
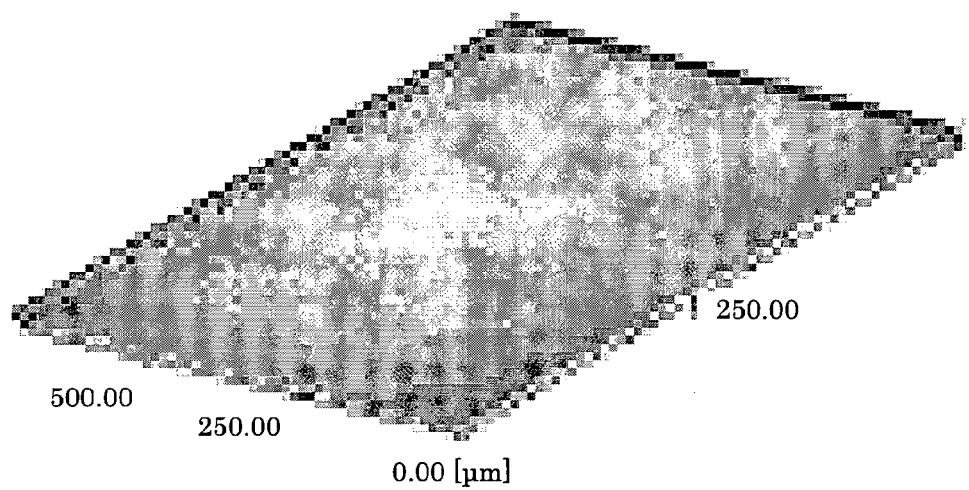

The results of measurements of the speeds at which dots spread, in the case where the liquid A-5 or A-10 and a liquid B-5 or B-7 were used, are shown in Table 5 below. FIGS. 8-1 to 8-8 show three-dimensional images of photographs in relation to the measurements, taken with a laser microscope; the layer thickness of the liquid A was approximately 60 µm. FIGS. 8-1 and 8-2 are both related to a combination of the liquid A-10 and the liquid B-5, FIGS. 8-3 and 8-4 are both related to a combination of the liquid A-10 and the liquid B-7, FIGS. 8-5 and 8-6 are both related to a combination of the liquid A-5 and the liquid B-5, and FIGS. 8-7 and 8-8 are both related to a combination of the liquid A-5 and the liquid B-7. Also, FIGS. 8-1, 8-3, 8-5 and 8-7 are related to a conveyance speed of 500 mm/sec and a length of time of 70 milliseconds spent after the ejection and until the curing with light, and FIGS. 8-2, 8-4, 8-6 and 8-8 are related to a conveyance speed of 100 mm/sec and a length of time of 350 milliseconds spent after the ejection and until the curing with light.

As shown in FIGS. 8-1 to 8-8, it is understandable that as the surface tension of the liquid B became lower, dots spread more easily, and the pattern in the form of a periodic flat surface according to (3), where the liquid B-7 uniformly spread, was formed at a sample transfer speed of 100 mm/sec (with the application of light taking place approximately 350 milliseconds after the ejection of the liquid B). It is understandable that unless the gap between each dot was filled as much as possible with the liquid B, there were differences in the concentration of the pigment contained in the liquid B as in the case where the speed was high. Accordingly, to allow the pigment to spread completely uniformly, it is preferred that light be applied after dots have spread to such an extent that cells are filled with the dots. It should be reiterated that the liquid A having a low viscosity and a high static surface tension can be made smooth and uniform in a short period of time.

Such places filled with dots as just described are not problematic; however, in the case of single dots, dots spread a great deal unless they hit adjacent dots. This could pose a problem, especially when an inkjet image is formed. In that case, though, by applying light at a timing when the diameter of each dot circle is not very different from √2 times the length of one side of each pixel, dots do not spread too much even in the case of application of single dots, and further, a uniform cell pattern in the form of flat surfaces can be obtained. When the resolution is 150 dpi, pixels can be filled by allowing each dot to spread to a diameter of 240 μm, and spreading of single dots can even be reduced. As far as FIGS. 8-1 to 8-8 are concerned, in order to make the spreading of the colorant (pigment) completely uniform, it seems advisable to postpone the application of light until the diameter of each dot becomes 280 μm or greater, in other words until the diameter of each dot becomes approximately 1.66 times (which is slightly greater than √2 (=1.41) times) the length of one side of each pixel at 150 dpi×150 dpi.

In Table 5, (A) denotes "liquid A" and (B) denotes "liquid B".

Example 8

A layer of the liquid A-1 was provided as in Example 1, then the liquid B-2 was ejected.

In Example 8, the liquid B-2 contained no pigment, and thus a cured film having a transparent cell pattern with a concavo-convex shape based upon an approximate sine curve was obtained.

Ejection of droplets which contain a functional material over this cured film makes it possible to store the functional material surely in concave portions of cells, even if neither a hydrophobic pattern nor a hydrophilic pattern is provided.

Example 9

By changing the pigment of the liquid B-1 of Example 1 to pigments of red (R), green (G) and blue (B) and alternately ejecting the liquids B-1, it was possible to obtain a color filter with a colored cell pattern, usable for liquid-crystal display.

The foregoing method makes it possible to apply a colorant very uniformly in comparison with ordinary inkjet application of a colorant over a solid surface. Also, in the case where an image in the form of cells is needed but an amplitude with respect to a direction perpendicular to a liquid surface is not needed, a delay in the timing of curing by the application of light (for example, if curing is performed when 300 milliseconds have passed after the ejection of the liquid B-1) makes it possible to obtain a film having the pattern in the form of a periodic flat surface according to (3).

By performing curing with light when 1 second or more had passed after the ejection of the liquid B-1, there was virtually no problem with the amplitude at the surface in practical use.

Example 10

As ejection liquids, the liquid B-3 as a colored ink containing a pigment and also the liquid B-2 as a clear ink containing

TABLE 5

| (A) Type | (A) Static surface tension (mN/m) | (A) Viscosity (mPas) | (B) Type | (B) Static surface tension (mN/m) | (B) Viscosity (mPas) | Length of time having passed (msec) | Dot diameter (μm) |
|---|---|---|---|---|---|---|---|
| A-10 | 38 | 520 | B-5 | 39 | 58 | 70 | 125 |
| | | | | | | 350 | 265 An area of 150 dpi × 150 dpi was barely filled. (There were differences in concentration.) |
| | | | B-7 | 22 | 58 | 70 | 203 |
| | | | | | | 350 | 315 An area of 150 dpi × 150 dpi was completely filled. (There was no difference in concentration.) |
| A-5 | 38 | 1,222 | B-5 | 39 | 58 | 70 | 92 |
| | | | | | | 350 | 161 |
| | | | B-7 | 22 | 58 | 70 | 162 |
| | | | | | | 350 | 280 An area of 150 dpi × 150 dpi was completely filled. (There was no difference in concentration.) | no pigment were prepared. The liquid B-3 was ejected so as to form a solid image, then surroundings of the solid image were covered with the clear ink as shown in FIG. 4. Thus, the clear ink prevented the pigment from bleeding to the surroundings, thereby preventing image bleeding. When the foregoing method is used to form an inkjet image, ideal pixels with uniform spreading of a colorant can be obtained.

Note that, also regarding the combination of the liquid A-10 and the liquid B-7 and the combination of the liquid A-5 and the liquid B-7 employed in Example 7, if a clear ink is prepared by removing the pigment from the liquid B-7 and a solid image formed of the pigment is surrounded by the clear ink as shown in FIG. 4, it is possible to prevent the pigment from excessively spreading to the surroundings of the solid image formed of the pigment (prevent bleeding). The foregoing method can be effectively applied to inkjet film formation in organic electronics.

Example 11

An oxytitaniumphthalocyanine pigment with photo-charge-generating capability was dispersed at high concentration into a monomer liquid with a low surface tension to obtain a liquid B, and this liquid B was ejected over the liquid surface of the liquid A-1, thereby making it possible to obtain a film having a pattern where a charge-generating agent uniformly spread. The foregoing method can serve as a method of easily producing a photosensitive layer of a photoelectric conversion element by inkjet.

Example 12

Production of cell patterns was examined as in Example 1, changing the distance between dots.

For production of a periodic cell with less variation between cells in terms of shape, what is important is the relationship between the distance between dots formed by liquid ejection and the diameter of each ejected droplet.

When droplets each having a mass of approximately 7 ng to 8 ng were ejected at 150 dpi×150 dpi (Diameter of ejected droplet/Length of one side of cell=0.15), there was little variation in the shape of a cell pattern formed; whereas when droplets were ejected at 300 dpi×300 dpi (Diameter of ejected droplet/Length of one side of cell=0.3), the size of the ejected droplets was very large in comparison with the size of pixels, and the shape of cells varied to a slightly greater extent (the shape of each cell deviated from a square). Further, when the distance between dots shortened, the shape of cells deteriorated, which was not suitable for a cell pattern. The foregoing examination revealed that at least the following was preferable: Diameter of ejected droplet/Distance between dots=0.4 or less Example 13

Liquid ejection was carried out as in Example 1, using the following as substrates: GLASS SLIDE 57213 (arithmetic mean roughness (Ra)=0.04 μm or less), a polyethylene film (Ra=0.04 μm or less), coated paper for offset printing (Ra=0.29 μm, 0.25 μm and 0.46 μm) and high-quality paper (Ra=1.6 μm to 2 μm).

As a result, it was found that, to form a favorable cell pattern, the arithmetic mean roughness (Ra) needed to be 1 μm or less.

The arithmetic mean roughness (Ra) was measured using a laser microscope.

Based upon the above results, unspecific conditions concerning physical properties required for formation of the cell patterns, which can be organized at this point in time, are shown in Table 6.

[In the case where the static surface tension of the liquid B is in the range of 20 mN/m to 30 mN/m (at 25° C.)]

Note that the conditions concerning physical properties are inferred from the results of the present experiments; when the static surface tension of the liquid A is in the range of 25 mN/m to 30 mN/m, the formed pattern can also be understood to be somewhere between a dot pattern and a cell pattern.

Also note that the patterns according to (1) to (4) and dot patterns are subject to broad classification, and that each pattern has variations in minute structure.

TABLE 6

| Surface tension of liquid A (25° C.) (mN/m) | Viscosity of liquid A (25° C.) (mPas) | Layer thickness of liquid A (μm) | Length of time spent after ejection of liquid B and until application of light (msec) | Pattern |
|---|---|---|---|---|
| 35 or greater | 50 or greater | Not limited | 300 or less | (1) |
| 35 or greater | 50 or greater | Not limited | 300 or more | (3) |
| 40 or greater | 50 or less | 10 or greater | Not limited | (3) |
| 40 or greater | 50 or less | 10 or less | 300 or more | (4) |
| 35 or greater | 1,000 or greater | Not limited | 300 or more | (2) |
| 30 to 35 | | | | Somewhere between dot pattern and cell pattern |
| 30 or less | Not limited | Not limited | Not limited | Dot pattern |

INDUSTRIAL APPLICABILITY

A film and a method of producing a film according to the present invention can be applied to any field which can utilize an inkjet process and can, for example, be suitably used to produce an organic electroluminescence element, a solar battery, an organic thin-film transistor, a liquid-crystal color filter, a biochip, an allergy-testing chip, etc. Also, the film and the method can be utilized in forming an image having ideal pixels where a pigment uniformly spreads over an entire surface.

REFERENCE SIGNS LIST

1 Substrate
2 Gate electrode
3 Gate insulating film
4 Source electrode
5 Drain electrode
6 Organic semiconductor film

The invention claimed is:
1. A method of producing a film, the method comprising:
(I) ejecting a liquid B over a liquid surface comprising an active energy ray-curable liquid A by an inkjet process, according to a predetermined periodic signal; and subsequently

(II) applying an active energy ray to the liquid A and the liquid B, thereby curing and obtaining a film comprising a pattern according to any one of (1) to (4):
(1) a smooth pattern comprising a periodic amplitude based upon a trigonometric function;
(2) a pattern comprising a periodic depression;
(3) a pattern in the form of a periodic flat surface; and
(4) a pattern comprising a periodic semicylindrical shape,
wherein the liquid A is greater than the liquid B in static surface tension at 25° C., and the liquid A has a static surface tension of 35 mN/m or greater at 25° C.

2. The method of claim 1, wherein the liquid B comprises a functional material.

3. The method of claim 1, wherein the liquid B is an active energy ray-curable liquid.

4. The method of claim 1, wherein the diameter of an ejected droplet formed as the liquid B is ejected is 0.4 or less times the distance between ejected dots formed of the ejected liquid B.

5. The method of claim 1, wherein the pattern is a pattern in the form of cells, and wherein the liquid B is centered at a first central portion of a liquid B-ejected portion and uniformly spreads as far as a point close to a midpoint between the first central portion and a second central portion of an adjacent liquid B-ejected portion, thereby spreading over the entire liquid surface of the liquid A except for the midpoint and a peripheral portion where the liquid B is not ejected.

6. The method of claim 1, wherein the pattern is the smooth pattern according to (1), having a periodic amplitude of 1 µm or greater based upon a trigonometric function, wherein the liquid B spreads over the liquid surface of the liquid A, the liquid B-ejected portion serves as a concave portion, and there is a convex portion in the vicinity of a midpoint between adjacent concave portions; and
wherein the liquid A has a viscosity of 50 mPas or greater at 25° C., and the length of time between the ejection of the liquid B and the curing is within 300 milliseconds.

7. The method of claim 1, wherein the pattern is the pattern according to (2), wherein the depression is periodically formed at a midpoint between adjacent liquid B-ejected portions; and
wherein the liquid A has a viscosity of 1,000 mPas or greater at 25° C., and the active energy ray is applied to perform the curing, when 300 milliseconds or more have passed after the ejection of the liquid B.

8. The method of claim 1, wherein the pattern is the pattern according to (3); and
wherein the liquid A has a viscosity of 50 mPas or greater at 25° C., and the active energy ray is applied to perform the curing, when 300 milliseconds or more have passed after the ejection of the liquid B.

9. The method according to claim 1, wherein the pattern is the pattern according to (3); and
wherein the liquid A has a viscosity of 50 mPas or less at 25° C., and the active energy ray is applied to perform the curing, within 300 milliseconds after the ejection of the liquid B.

10. The method of claim 1, wherein the pattern is the pattern according to (4); and
wherein the liquid A has a viscosity of 50 mPas or less at 25° C. and a static surface tension of 40 mN/m or greater at 25° C., the liquid A has a layer thickness of 10 µm or less, and the active energy ray is applied to perform the curing, when 300 milliseconds or more have passed after the ejection of the liquid B.

11. The method of claim 1, wherein the film has the pattern according to (4), wherein distances between dots formed of the liquid B with respect to an X-axis direction and a Y-axis direction at the time when the liquid B is ejected are adjusted such that the shorter distance between the dots corresponds to a major axis direction of the semicylindrical shape.

12. The method of claim 1, wherein the pattern is the pattern according to any one of (1) to (3); and
wherein the static surface tension of the liquid A at 25° C. is adjusted to 35 mN/m to 40 mN/m and the layer thickness of the liquid A is adjusted to 10 µm or less so as to form a thin-film pattern without a semicylindrical shape.

13. The method of claim 1, further comprising, prior to the ejecting (I):
applying the liquid A over a substrate having an arithmetic mean roughness (Ra) of 1 µm or less.

14. The method of claim 1, wherein the liquid B comprises a first ink comprising a functional material and a clear ink not comprising a functional material; and
wherein the clear ink is ejected around a portion to which the first ink is ejected, so as to prevent the functional material from excessively spreading.

15. The method of claim 2, wherein a speed at which the liquid B spreads in a circle over the liquid A upon ejection of the liquid B is examined beforehand; and
wherein the functional material is prevented from excessively spreading by determining the length of time between the ejection of the liquid B and the curing such that the active energy ray is applied at a timing when the diameter of the circle is equivalent to $\sqrt{2}\pm50\%$ of the length of one side of a pixel.

16. The method of claim 2, wherein a speed at which the liquid B spreads in a circle over the liquid A upon ejection of the liquid B is examined beforehand; and
wherein a smooth film comprising the pattern in the form of the periodic flat surface according to (3), wherein the functional material uniformly spreads, is formed by determining the length of time between the ejection of the liquid B, and the curing such that the active energy ray is applied at a timing when the diameter of the circle is 1.5 or more times the length of one side of a pixel.

17. The method of claim 1, wherein two or more liquids B which comprise different functional materials are employed, and the difference in dot spreading speed between the liquids B is within ±50%.

* * * * *